(12) United States Patent
Podgorny et al.

(10) Patent No.: US 10,147,037 B1
(45) Date of Patent: Dec. 4, 2018

(54) METHOD AND SYSTEM FOR DETERMINING A LEVEL OF POPULARITY OF SUBMISSION CONTENT, PRIOR TO PUBLICIZING THE SUBMISSION CONTENT WITH A QUESTION AND ANSWER SUPPORT SYSTEM

(71) Applicant: Intuit Inc., Mountain View, CA (US)

(72) Inventors: Igor A. Podgorny, San Diego, CA (US); Matthew Cannon, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 620 days.

(21) Appl. No.: 14/810,656

(22) Filed: Jul. 28, 2015

(51) Int. Cl.
    *G06N 5/02* (2006.01)
    *G06Q 30/00* (2012.01)

(52) U.S. Cl.
    CPC .......... *G06N 5/022* (2013.01); *G06Q 30/016* (2013.01)

(58) Field of Classification Search
    None
    See application file for complete search history.

(56) References Cited

U.S. PATENT DOCUMENTS

| | | | |
|---|---|---|---|
| 5,471,382 A | 11/1995 | Tallman et al. | |
| 5,519,608 A | 5/1996 | Kupiec | |
| 6,147,975 A | 11/2000 | Bowman-Amuah | |
| 7,013,263 B1 | 3/2006 | Isaka et al. | |
| 7,222,078 B2 | 5/2007 | Abelow | |
| 7,385,716 B1 | 6/2008 | Skaanning | |
| 7,594,176 B1 | 9/2009 | English | |

(Continued)

FOREIGN PATENT DOCUMENTS

| | | |
|---|---|---|
| CN | 101520802 | 4/2009 |
| EP | 2159715 | 3/2010 |
| WO | WO 2011/053830 | 5/2011 |

OTHER PUBLICATIONS

The Scientific Marketer, "Uplift Modelling FAQ", article date of Sep. 27, 2007, retrieved from http://scientificmarketer.com/2007/09/uplift-modelling-faq.html (Year: 2007).

(Continued)

*Primary Examiner* — Alan Chen
(74) *Attorney, Agent, or Firm* — Hawley Troxell Ennis & Hawley LLP; Philip McKay

(57) ABSTRACT

A method and system determines a level of popularity of submission content, prior to publicizing the submission content with a question and answer customer support system, to improve user satisfaction with content of the question and answer customer support system, according to one embodiment. The method and system include receiving submission content from a user, and identifying a plurality of attributes of the submission content, according to one embodiment. The method and system include applying at least some of the attributes of the submission content to an analytics model to generate a score that is indicative of a likely level of popularity of the submission content, according to one embodiment. Prior to publicizing the submission content with the question and answer customer support system, the method and system include providing suggestions to the user for altering attributes of the submission content, to affect the score, according to one embodiment.

40 Claims, 13 Drawing Sheets

(56) References Cited

U.S. PATENT DOCUMENTS

| | | |
|---|---|---|
| 7,685,144 B1 | 3/2010 | Katragadda |
| 7,974,860 B1 | 7/2011 | Travis |
| 8,943,145 B1 | 1/2015 | Peters et al. |
| 9,015,031 B2 | 4/2015 | Ferrucci et al. |
| 9,063,983 B1 | 6/2015 | Lee |
| 9,582,757 B1 | 2/2017 | Holmes et al. |
| 9,633,309 B2 | 4/2017 | Giffels et al. |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0099924 A1 | 5/2003 | Tsuboi et al. |
| 2004/0024739 A1* | 2/2004 | Copperman ...... G06F 17/30616 |
| 2005/0114327 A1 | 5/2005 | Kumamoto et al. |
| 2007/0011131 A1 | 1/2007 | Delefevre |
| 2007/0259325 A1 | 11/2007 | Clapper |
| 2008/0215541 A1 | 9/2008 | Li et al. |
| 2008/0294637 A1 | 11/2008 | Liu |
| 2009/0012926 A1 | 1/2009 | Ishikawa et al. |
| 2009/0162824 A1 | 6/2009 | Heck |
| 2009/0248659 A1 | 10/2009 | McCool et al. |
| 2009/0253112 A1 | 10/2009 | Cao et al. |
| 2009/0265340 A1 | 10/2009 | Barcklay et al. |
| 2010/0068687 A1 | 3/2010 | Bertelsen |
| 2010/0070554 A1 | 3/2010 | Richardson et al. |
| 2010/0076998 A1 | 3/2010 | Podgorny et al. |
| 2010/0185630 A1 | 7/2010 | Cheng et al. |
| 2010/0191686 A1 | 7/2010 | Wang et al. |
| 2010/0203492 A1 | 8/2010 | Nibe et al. |
| 2010/0205550 A1 | 8/2010 | Chen et al. |
| 2010/0235361 A1 | 9/2010 | Chandran et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0264569 A1 | 10/2011 | Houseworth et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0084293 A1 | 4/2012 | Brown et al. |
| 2012/0130910 A1 | 5/2012 | Al-Alami |
| 2012/0130978 A1 | 5/2012 | Li et al. |
| 2012/0166438 A1 | 6/2012 | Wu et al. |
| 2012/0219142 A1 | 8/2012 | Gould |
| 2012/0233191 A1 | 9/2012 | Ramanujam |
| 2012/0331052 A1 | 12/2012 | Rathod |
| 2013/0019286 A1 | 1/2013 | Barborak et al. |
| 2013/0066693 A1 | 3/2013 | Laird-McConnell et al. |
| 2013/0073390 A1 | 3/2013 | Konig et al. |
| 2013/0282363 A1 | 10/2013 | Fan et al. |
| 2013/0304730 A1 | 11/2013 | Zhou |
| 2013/0325992 A1* | 12/2013 | McGann ............... H04L 51/046 709/206 |
| 2013/0339870 A1 | 12/2013 | Tandra Sishtla et al. |
| 2014/0006012 A1 | 1/2014 | Zhou et al. |
| 2014/0088944 A1* | 3/2014 | Natarajan ............... G06Q 30/02 703/13 |
| 2014/0119531 A1 | 5/2014 | Tuchman et al. |
| 2014/0189829 A1 | 7/2014 | McLachlan et al. |
| 2014/0222669 A1 | 8/2014 | Novak et al. |
| 2014/0308648 A1 | 10/2014 | Jain |
| 2014/0316856 A1 | 10/2014 | Williams et al. |
| 2014/0337257 A1* | 11/2014 | Chatterjee ............ G06N 99/005 706/12 |
| 2015/0052087 A1* | 2/2015 | Srinivasan ............... G06N 5/02 706/12 |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0254785 A1 | 9/2015 | Yang |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0103833 A1 | 4/2016 | Sanders et al. |
| 2016/0189029 A1 | 6/2016 | Giffels et al. |
| 2016/0196497 A1 | 7/2016 | Allen et al. |
| 2016/0217472 A1 | 7/2016 | Podgorny et al. |
| 2016/0283491 A1 | 9/2016 | Lu et al. |
| 2016/0306846 A1 | 10/2016 | Adams, Jr. et al. |
| 2017/0032251 A1 | 2/2017 | Podgorny et al. |
| 2017/0032468 A1 | 2/2017 | Wang et al. |
| 2017/0124184 A1 | 5/2017 | Podgorny et al. |
| 2018/0032890 A1 | 2/2018 | Podgorny et al. |

OTHER PUBLICATIONS

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the 33$^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

* cited by examiner

| TYPE/FORMAT OF QUESTION | OCCURRENCE PERCENTAGE (%) | SATISFIED WITH ANSWER (%) |
|---|---|---|
| CLOSED-ENDED (Yes/No or Multiple choice) | 28.1 | 85.9 |
| WHO (Person) | 1.6 | 81.4 |
| WHAT (Thing or object) | 9.7 | 73.1 |
| WHERE (Position or place) | 8.6 | 70.2 |
| WHEN (Time or occasion) | 5.5 | 68.2 |
| ILL-FORMED (Search Query) | 28.7 | 66.8 |
| HOW (Way or form) | 21.6 | 66.4 |
| WHY (Reason or explanation) | 7.5 | 56.3 |

FIG. 1A

| MODEL ATTRIBUTE | WALD CHI-SQUARE |
|---|---:|
| "CLOSED-ENDED" TYPE | (+) 339 |
| "WHY" TYPE | (−) 317 |
| REPORTING A PROBLEM | (−) 180 |
| "HOW" TYPE | (−) 105 |
| INTENT TO CALL/CHAT | (−) 104 |
| SUBJECT LENGTH | (+) 87 |
| SOFTWARE RELATED | (−) 77 |
| PERSONAL PRONOUN "YOU" | (−) 75 |
| INTENT TO PRINT TAX RETURN | (−) 66 |
| QUESTION MARK IN QUESTION | (+) 59 |

FIG. 1C

Ask a multiple-choice question (recommended):

Can, are, do, does, if, is, should, will...

Answer choices:

⦿ Yes or No
◯ Let me specify...

—or—

Ask an open-ended question:

Where, what, when, who, how...

FIG. 2A

QUESTION OPTIMIZER

Get better answers!
Can you rephrase "Why can't I print?"

BEST: Ask it as a multiple choice question

Can, are, do, does, if, is, should, will, which...

Be concise. You can add details next   15 more characters required

Answer choices:
This will help you get the answer you need,
but will not prevent people from adding detailed answers.
- ⦿ Yes or No
- ○ Let me specify...

GOOD: Ask it as an open-ended question

Where, what, when, who, how...

Be concise. You can add details next   15 more characters required

[ Skip ]  [ Submit optimized question ]

FIG. 2B

METHOD AND SYSTEM FOR DETERMINING A LEVEL OF POPULARITY OF SUBMISSION CONTENT, PRIOR TO PUBLICIZING THE SUBMISSION CONTENT WITH A QUESTION AND ANSWER SUPPORT SYSTEM

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users with specialized advice and answers to their specific questions is a huge undertaking that can easily, and rapidly, become economically infeasible.

To address this problem, many providers of software systems implement or sponsor one or more question and answer based customer support systems. Typically, a question and answer based customer support system includes a hosted forum through which a user can direct their specific questions, typically in a text format, to a support community that often includes other users and/or professional support personal.

In many cases, once a user's specific question is answered by one or more members of the support community through the question and answer based customer support system, the user's specific question, and the answer to the specific question provided by the support community, is categorized and added to a customer support question and answer database associated with the question and answer based customer support system. In this way, subsequent users of the software system can access the user's specific question or topic, and find the answer to the user's question, via a search of the customer support question and answer database. As a result, a dynamic customer support question and answer database of categorized/indexed user questions and answers is made available to users of the software system through the question and answer based customer support system.

The development of customer support question and answer databases has numerous advantages including a self-help element whereby a searching user, i.e., a user accessing the resulting question and answer pair, can find an answer to their particular question by simply searching the customer support question and answer database for topics, questions, and answers related to their issue. In addition, if the answer to the user's specific question is not in the customer support question and answer database, the user can then become an asking user by submitting their question to the question and answer based customer support system, typically through the same web-site and/or user interface. Consequently, by using a question and answer based customer support system that includes a customer support question and answer database, potentially millions of user questions can be answered in an efficient and effective manner, and with minimal duplicative effort.

The content that users are exposed to, within the question and answer based customer support system, may affect the reputation of the service provider of the question and answer based customer support system. If users' queries consistently are directed to answers and/or questions that are unsatisfactory, the users will communicate dissatisfaction by, for example, using competitor question and answer systems, providing negative reviews in forums, and avoiding other products that are available from the service provider. Furthermore, the more dissatisfied users are with answers found in the question and answer based customer support system, the more likely the users are to request live customer support. This is financially undesirable for a service provider because providing live customer support, such as telephone call and web chats, is significantly more expensive than maintaining a database of answers provided by a support community (e.g., provided at least partially by volunteers).

What is needed is a method and system for determining/identifying/predicting a level of popularity of submission content, prior to publicizing the submission content with a question and answer support system, to (for example) reduce the use of live customer support and to (for example) improve conversion rates of potential customers to paying customers of services offered by a service provider.

SUMMARY

Embodiments of the present disclosure address some of the shortcomings associated with traditional question and answer based customer support systems by determining the popularity of submission content (e.g., questions), prior to publicizing the submission content with a question and answer customer support system, to improve user satisfaction with content of the question and answer customer support system. The question and answer customer support system can be associated with an electronic tax return preparation system, or other service provided by a service provider. The service provider provides the question and answer customer support system, at least partially, to improve revenue for the service provider. By configuring a question and answer customer support system to predict the popularity of submission content prior to publicizing the submission content, the question and answer customer support system can improve revenue for the service provider by: increasing conversion rates of potential customers to paying customers, decreasing live customer support costs (e.g., web chat telephone calls), and introducing potential customers to the services offered by the service provider (e.g., attracting new customers), according to one embodiment. The question and answer customer support system performs these functions by predicting which questions/submission content are going to be most widely viewed and/or voted-on by users of the question and answer customer support system, during the submission content creation process, according to one embodiment. The question and answer customer support system can then selectively alter attributes of submission content to make the submission content more popular or less popular, depending upon the potential impact of the submission content on the business goals of the service provider. In other words, if the question and answer customer support system determines/predicts that particular submission content may be detrimental to the service provider, then the submission content can be altered so that it is less likely to be popular (e.g., widely viewed or voted upon), according to one embodiment. Alternatively, if the question and answer customer support system determines/predicts that particular submission content may be beneficial to the service provider, then the submission content can be altered so that it is more likely to be popular, according to one embodiment.

The question and answer customer support system determines the popularity (or likely level of popularity) of submission content (e.g., questions) by receiving submission content from a user, identifying attributes of the submission content, and applying at least some of the attributes of the submission content to an analytics model to generate a score that is indicative of a likely (e.g., predicted) level of popularity of the submission content, according to one embodiment. The attributes include, but are not limited to, a character length of a question summary of the submission content, a character length of question details of the submission content, and a first token (e.g., word) of the question summary of the submission content, according to one embodiment. The level of popularity can include various classes of popularity, such as, but not limited to, top 1%, 5%, 10%, etc. of posts (e.g., publicized submissions made to the question and answer customer support system) that receive most of the customer views or votes from users of the question and answer customer support system, according to one embodiment.

Prior to publicizing the submission content with the question and answer support system, the question and answer customer support system provides suggestions to the user for altering the submission content, to affect the score that is indicative of the likely level of popularity of the submission content, according to one embodiment. The question and answer customer support system can be configured to suggest alterations to the submission content-based, for example, on the predicted class of popularity (e.g., top 10 percent or lower 90 percent) of the submission content, according to one embodiment. In another embodiment, the question and answer customer support system automatically alters attributes of the submission content to increase the popularity of the submission content if the submission content is likely to receive up votes (e.g., be of high quality), or alters attributes of the submission content to decrease the popularity of the submission content if the submission content is likely to receive down votes (e.g., be of low-quality), according one embodiment.

These and other embodiments are disclosed in more detail below.

The disclosed method and system for determining a level of popularity of submission content (e.g., questions), prior to publicizing the submission content with a question and answer support system, provides for significant improvements to the technical fields of customer support, information dissemination, software implementation, and user experience. In addition, using the disclosed method and system for determining a level of popularity of submission content results in more efficient use of human and non-human resources, fewer processor cycles being utilized, reduced memory utilization, and less communications bandwidth being utilized to relay data to and from backend systems because users are less likely to request live customer support and because using question popularity attributes to direct users to questions that are likely to receive up votes can result in less new questions being submitted to the customer support system. As a result, computing systems are transformed into faster, more efficient, and more effective computing systems by implementing the method and system for determining a level of popularity of submission content, prior to publicizing the submission content with a question and answer support system.

BRIEF DESCRIPTION OF THE DRAWINGS

FIG. 1A shows a table of results data obtained through analysis of actual questions submitted to a question and answer based customer support system indicating question types, the frequency of the question types as a percentage of questions asked, and ranking of the question types by up vote fraction;

FIG. 1C is a table of results data obtained through analysis of actual questions submitted to a question and answer based customer support system showing the Wald Chi-square statistics for the top subject attributes of a user vote analytics model;

FIG. 2A is an illustrative example of a first question transformation interface screen used to provide users format transformation/question reformation instructions that direct users in transforming improperly formatted questions into properly formatted closed-ended questions in accordance with one embodiment;

FIG. 2B is an illustrative example of a second question transformation interface screen used to provide users format transformation/question reformation instructions and using a question optimizer approach to direct users towards transforming improperly formatted questions into properly formatted questions in accordance with one embodiment;

Figure 1B:
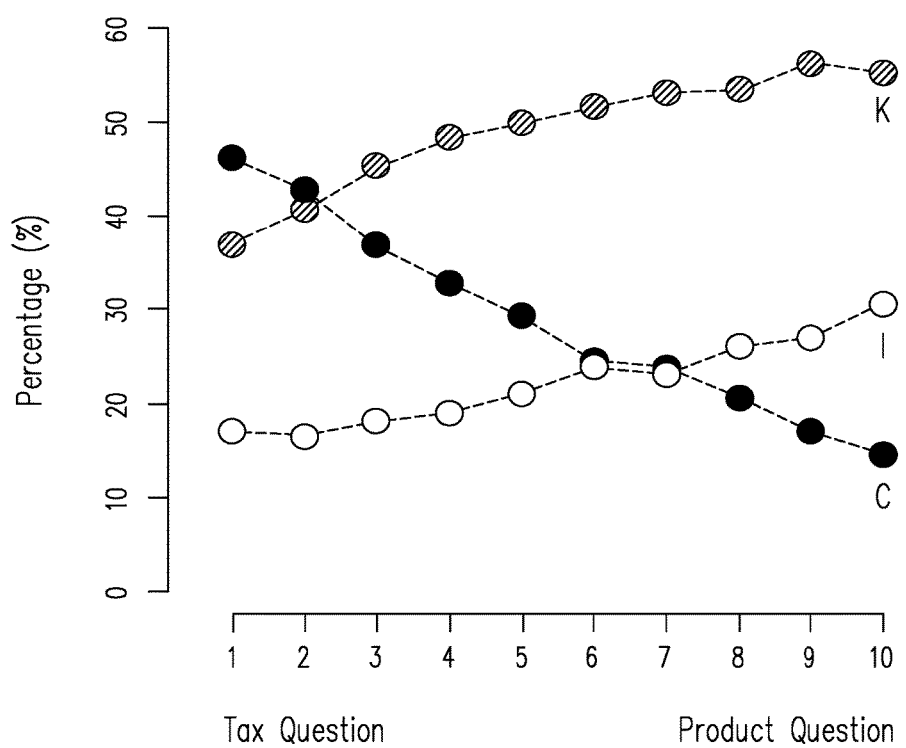
FIG. 1B is a graph of results data obtained through analysis of actual questions submitted to a question and answer based customer support system showing the discovered relationship between "subject matter questions," "product related questions," and the category of question asked.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

TERM DEFINITIONS

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment;

and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "question quality indicator" includes any mechanism, means, or feature/function provided to indicate to a user a determined quality of a question being provided by the user. Specific examples of question quality indicators include, but are not limited to, meter displays; line displays; score displays; audio content; visual content; images; backgrounds; avatars; highlighting mechanisms; icons; and any other features that individually, or in combination, relay to a user a determined quality of a question being submitted.

As used herein, the term "question popularity indicator" includes any mechanism, means, or feature/function provided to indicate to a user a determined/estimated popularity of a question being provided by the user. Specific examples of question popularity indicators include, but are not limited to, meter displays; line displays; score displays; audio content; visual content; images; backgrounds; avatars; highlighting mechanisms; icons; and any other features that individually, or in combination, relay to a user a determined, estimated, or predicted quality of a question being submitted.

Herein, the term "party," "user," "user consumer," and "customer" are used interchangeably to denote any party and/or entity that interfaces with, and/or to whom information is provided by, the method and system for determining a level of popularity of submission content, prior to publicizing the submission content with a question and answer support system as described herein, and/or a person and/or entity that interfaces with, and/or to whom information is provided by, the method and system for determining a level of popularity of submission content, prior to publicizing the submission content with a question and answer support system as described herein, and/or a legal guardian of person and/or entity that interfaces with, and/or to whom information is provided by, the method and system for determining a level of popularity of submission content, prior to publicizing the submission content with a question and answer support system as described herein, and/or an authorized agent of any party and/or person and/or entity that interfaces with, and/or to whom information is provided by, the method and system for determining a level of popularity of submission content, prior to publicizing the submission content with a question and answer support system as described herein. For instance, in various embodiments, a user can be, but is not limited to, a person, a commercial entity, an application, a service, and/or a computing system.

As used herein, the term "asking user" includes a user of a software system submitting submission content (e.g., a question) to a question and answer based customer support system.

As used herein, the term "searching user" includes a user of a software system submitting a search query to a customer support question and answer database associated with a question and answer based customer support system. An "answer recipient" includes one or both of the "asking user" and the "searching user", according to one embodiment.

As used herein, the term "responding user" includes a user of a software system who submits a response to submission content for the question and answer based customer support system. In one embodiment, the term "response" is interchangeably used with the term "reply", and the term "responding user" is interchangeably used with the term(s) "replying user" and/or "answering user". In one embodiment, a "responding user", "replying user", and/or "answering user" is a user who submits an answer to submission content (e.g., a question) and/or one who submits a comment to submission content in the question and answer based customer support system.

As used herein, submission content includes a question summary and question details, and the term "submission content" is used interchangeably with the term "question". A question summary is a character limited summary or articulation of the question, and the question details are additional information about the user or the circumstances surrounding the question summary. As used herein, a "post" is used to refer to a publicized or published version of the submission content, and may include comments and/or answers submitted by users in response to publicizing, publishing, hosting, and/or posting the submission content. Although submission content and a post may include similar information, one references content that has not been made publically available by a question and answer customer support system and the other has been made available for review, response, and comment by the public.

As used herein, the term "analytics model" or "analytical model" denotes one or more individual or combined algorithms or sets of equations that describe, determine, or predict characteristics of or the performance of a datum, a data set, multiple data sets, a computing system, and/or multiple computing system. Analytics models or analytical models represent collections of measured and/or calculated behaviors of attributes, elements, or characteristics of data and/or computing systems. The term "predictive model" is used to denote a type or category of analytics or analytical model.

Theory and Empirical Analysis

The embodiments disclosed herein were developed to incorporate theories and address relationships discovered through analysis of data collected from implementations/ embodiments of a question and answer based customer support system implemented by Intuit™ Inc. of Mountain View, Calif. The specific question and answer based customer support system through which the data was collected was the TurboTax™ AnswerXchange™ ("AXC") question and answer based customer support system.

AXC is a social question and answer based customer support system providing support for TurboTax™ customers and also serving as a discussion forum in the area of US Federal and State taxation. AXC is also used to generate reusable content for TurboTax™ user searches, i.e., to create a customer support question and answer database for TurboTax™ users. In fact, only 1.5% of AXC users are asking users who actually submit questions, while the remaining searching users look for answers by searching a customer support question and answer database provided through AXC.

AXC includes a support community of customer support personnel. In one embodiment, questions submitted to AXC are answered by members of the support community of customer support personnel. In one embodiment, the customer support personnel include paid professional support personnel in the employ of Intuit™ and volunteer, often non-paid, experienced/expert users of the TurboTax™ software system. In one embodiment, the volunteer expert users of the TurboTax™ software system are identified and certified by Intuit™.

Questions submitted to AXC are formulated in a variety of ways and directed to various broad categories. As one example, some questions are "product related questions", e.g., questions related to pricing, installation, version choice, etc. of the TurboTax™ software system that often had little or no relation to the subject matter/endeavor supported by the TurboTax™ software system, i.e., tax preparation. On the other hand, some questions are "subject matter related," or substantive questions, directly related to the subject matter/endeavor supported by the TurboTax™ software system, i.e., Federal and State taxation and tax preparation.

As an example, the questions "What version of TurboTax™ should I use?" or "How do I install TurboTax™?" would be product related questions while the questions "Can I deduct my computer?" or "What is my adjusted gross income?" would be subject matter related questions. As discussed below, it is empirically determined that, in general, product related questions are best answered by paid support personnel in the employ of Intuit™ while subject matter related questions are often best answered by volunteer expert users.

Similar to other question and answer based customer support systems, AXC measures the quality of content, and answer content in particular, by collecting statistics of up and down votes directed to answer content provided by the asking users and searching users where an up vote indicates user satisfaction with the answer to the question and a down vote indicates user dissatisfaction with the answer to the question.

At the same time, the AXC questions are not ranked or judged based on quality of content beyond user satisfaction ratings, unless the question is determined as inappropriate and blocked from AXC. Therefore, user satisfaction with answer content in AXC typically would be derived from user votes alone, thus providing a useful metric for answer quality. For example, this approach is applied to predicting answer satisfaction in AXC based on the one or more attributes of the question and answer combined with one or more AXC users' attributes. On the other hand, as disclosed herein, an analysis of AXC vote statistics found that answer quality/satisfaction is largely predetermined by the question subject matter and/or question type/format, and that the users' satisfaction votes can be predicted with reasonable accuracy based on the attributes of the question alone. This finding provides a practical framework for "pro-active" detection of low-quality content at the question submission stage, i.e., before the question is even answered.

As noted above, questions submitted to AXC are formulated in a variety of ways and directed to various broad categories and subjects and in various question formats representing various question types. As one example, one user may ask "What version of TurboTax should I use?" Another user may ask "How do I install TurboTax?" Yet another user may ask "Can I deduct my computer?" It was determined that the optimal AXC design must be based on an empiric question taxonomy taking into account one or more of, the question category, the question format, the question grammar structure, the type of anticipated answer, asker type, and various other factors.

The Inventors began with general knowledge/open-ended question taxonomy. Specifically, the Inventors looked for "Wh- words" and "How" questions including interrogative pronouns such as "Who", "What", "When", "Where", "Why" and "How" used to compose general knowledge/open-ended category questions.

FIG. 1A is a table of results data obtained through the analysis of actual questions submitted to AXC. The table of FIG. 1A shows question types, also referred to herein as formats (column 101) of the 2014 AXC questions received, the frequency of the question types as a percentage of questions asked (column 102), and ranking of the question types/formats by up vote fraction (column 103) that are shown in FIG. 1A in descending order. It is noted that the sum of up vote and down vote fractions can be equal to or greater than 100% because some questions may belong to more than one type. As seen in FIG. 1A, when "Wh- words" analysis was applied to the AXC question subjects with question summaries limited to 255 characters, 54.5% of the questions received fell into the general knowledge/open-ended category.

One of the Inventors' goals were to separate question types/formats by the observed statistics relating up and down votes associated with the answers provided to each question types/formats. The result of this analysis is shown in FIG. 1A. Referring to FIG. 1A, note that "Why" formatted questions can often indicate mildly negative sentiment and often imply a rhetorical question, e.g., "Why is this so difficult?" or "Why is this taking so much time?" The Inventors postulate that this explains the lowest up vote fraction of 56.3% being associated with the "Why" question type/format in the general knowledge/open-ended category, as shown in FIG. 1A.

Next, the Inventors selected closed-ended category questions from the 56.8% of AXC questions that did not belong to the general knowledge/open-ended category. Most of the closed-ended type/format questions in AXC were in the sub-category of "Yes/No" type/format questions. These "Yes/No" type/format questions typically start with an auxiliary verb such as "Do", "Can", "Be." As indicated by the name, the "Yes/No" type/format questions can be answered by a "Yes" or "No" answer. A specific illustrative example of a "Yes/No" question would be: "Can I deduct my computer?" with the possible answers "Yes, you can" or "No, you can't."

The second sub-category of closed-ended question type/format includes "Choice" type/format questions. "Choice" type/format questions generally start with an auxiliary verb as well, but also contain the conjunction "or." Consequently, "Choice" type/format questions usually result in a multiple choice answer embedded in the body of the question. A specific illustrative example of a "Choice" type/format question would be "Should I install X or Y version?" with the possible answers "You need to install Y," "You need to install X," "You need to install either X or Y," "You need to install neither X nor Y."

As seen in FIG. 1A, closed-ended type/format questions resulted in an impressive 85.9% up vote, i.e., 85.9% of users who submitted questions in the closed-ended format were satisfied with the answer provided. As seen in FIG. 1A, this was the highest satisfaction rating of all question types/formats. The high fraction of the up votes for the answers to the closed-ended type/format questions of in FIG. 1A is not surprising. Closed-ended type/format questions were typically long enough to provide sufficient context for answering, and were more likely to be subject matter related questions, as opposed to product related questions. As discussed below, subject matter related questions were channeled to volunteer expert users for answering and had a higher predicted likelihood of resulting in an up vote (see FIG. 1B discussed below).

Finally, if a question submitted to AXC was deemed to be neither a general knowledge/open-ended nor a closed-ended type/format question, the question was classified as being in the ill-formed question category by default. Most of the ill-formed category questions did not follow a grammatically correct question format either intentionally, e.g., search query type, or unintentionally, e.g., improper grammar, punctuation, etc., and were more difficult to answer. This, of course resulted in a higher probability of down vote from the users.

"How" and "Why" question types/formats were detectable with regular expressions analysis. Similarly "When", "Where" and "Who" question types/formats were detectable with regular expressions analysis but the analysis was slightly more involved as it typically required part-of-speech tagging to avoid confusion with relative adverbs and relative pronouns. However, as seen in FIG. 1A, these question types/formats were less common in AXC. More exotic question types/formats, such as "tag questions," "leading questions," and "embedded questions," were determined to be extremely rare in AXC and therefore were largely excluded from the Inventors' analysis.

FIG. 1B is a graph of results data obtained through analysis of actual questions submitted to AXC and showing the discovered relationship between: the percentage of up votes indicating user satisfaction with the answer provided (vertical axis), the category of question, e.g., "subject matter questions", or in the case of AXC, tax questions; "product related questions," or in the case of AXC, TurboTax™ product questions; and the type/format of the question asked. The horizontal axis in FIG. 1B was divided into Deciles 1 to 10, with Decile 1 corresponding to well-defined subject matter related questions, and Decile 10 corresponding to well-defined product related questions. Consequently, FIG. 1B displays the satisfaction percentages of general knowledge/open-ended (K), closed-ended (C), and ill-formed question types versus content type. In the Inventors' analysis, only answered and voted upon questions were used to ensure the results reported/displayed in FIG. 1B that were consistent with the results reported/displayed in FIG. 1A.

FIG. 1C is a table of results data obtained through analysis of actual questions submitted to AXC showing the Wald Chi-square statistics for the top subject attributes of an AXC asking user vote analytics (e.g., predictive) model. In FIG. 1C, the (+) and (−) signs indicate positive or negative correlation between attribute and up vote. As seen in FIG. 1C, closed-ended, "Why" and "How" question types are three out of the four most important model attributes. The third attribute, "Reporting a problem," was found to correlate with "Why" and "How" types. As noted above, "Why" questions are often rhetorical and may remain "unanswerable" unless the user provides further details.

Once the data of FIG. 1A, FIG. 1B, and FIG. 1C was obtained, an initial goal of correlating the different question types/formats with the observed statistics relating up and down votes associated with the answers provided to each question type/format was attained. Then three additional goals were identified: transforming "Why" and "How" type/format questions into to closed-ended type/format questions; transforming "unanswerable" questions into "answerable" questions; and transforming ill-formed questions into "well formed" questions.

With respect to the goal of transforming "Why" and "How" type/format questions into to closed-ended type/format questions, it was determined that the biggest positive and negative impacts on AXC user satisfaction came from the answers to closed-ended and "How/Why" type/format questions, respectively. While it is difficult to alter the broad category/subject of the question, e.g., switching user attention from product related questions to subject matter related questions, it was determined that it may be possible to transform the question type/format from a low quality format question, with a low predicted user satisfaction with any answer to the question, to a high quality format question, with a higher predicted user satisfaction with any answer to the question. For example, asking the user to re-phrase/transform a "Why" type/format question into a closed-ended type/format question.

With respect to the goal of transforming "unanswerable" questions into "answerable" questions, it was determined that the unanswerable questions were often formed as a statement without specific details. The task therefore involved a re-phrasing/transformation process similar to the process for transforming "Why" and "How" type/format questions into to closed-ended type/format questions, and also asking the user for more information.

With respect to the goal of transforming ill-formed questions into "well formed" questions, it was determined that re-phrasing/transforming ill-formed questions, e.g. making the questions more detailed and adding proper punctuation, may result in better answers. See FIG. 1B.

Figure 2C:
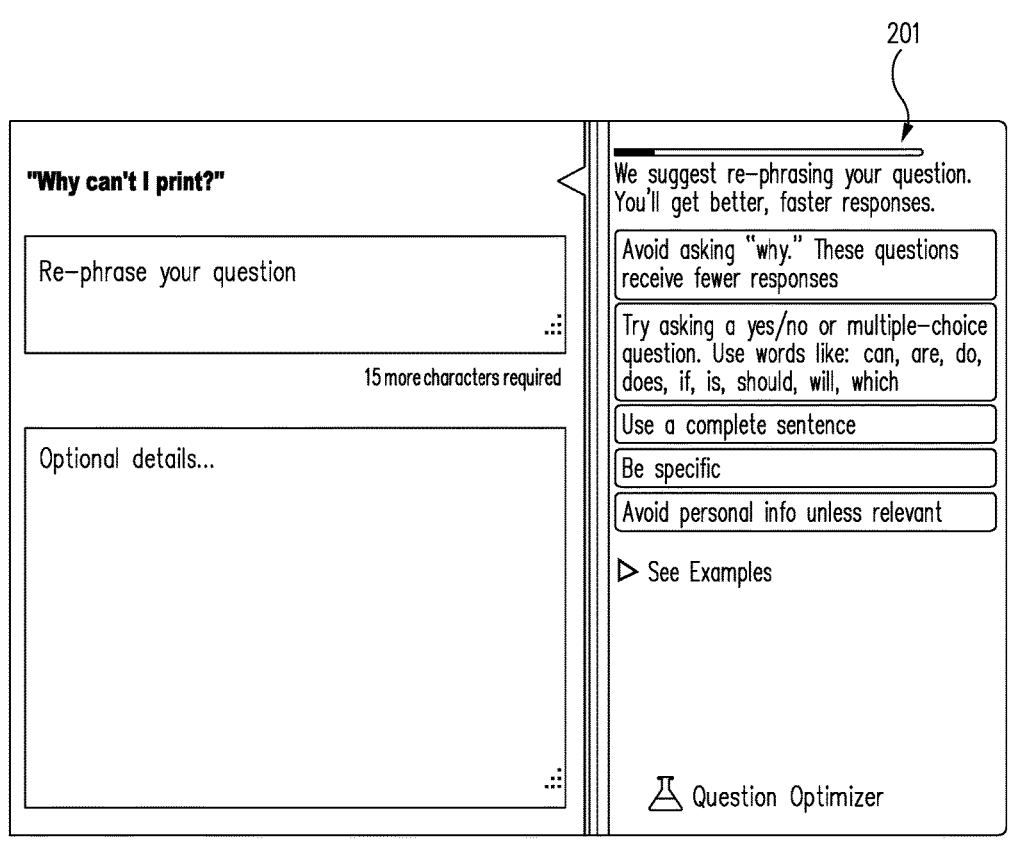
FIG. 2C is an illustrative example of a third question transformation interface screen used to provide users format transformation/question reformation instructions that direct users towards transforming improperly formatted questions into properly formatted questions and includes a visual question quality indicator, which provides a simple read of question-quality in accordance with one embodiment.

To address these three goals, the Inventors designed and tested three question transformation user interface screens used to provide format transformation/question reformation instructions that direct users towards transforming improperly formatted questions into properly formatted closed-ended questions. The three question transformation user interface screens are shown in FIGS. 2A, 2B, and 2C, and are discussed separately below.

The first experience prototype, and associated question transformation interface screen, the Inventors explored is shown in FIG. 2A. The experience prototype, and associated question transformation interface screen, of FIG. 2A used constraints to direct users towards asking closed-ended questions, and went as far as defaulting to Yes/No answer types/formats. The experience prototype, and associated question transformation interface screen, of FIG. 2A emphasized closed-ended question types/formats, which yield the highest rated answers (see FIG. 1A). This approach was ultimately determined to be less than ideal because of the front-loaded cognitive overhead it created that forced users to think about their question type/format before they had a chance to even phrase it, and which ultimately proved too burdensome on the user.

It was found survey-style answer choices helped phrasing. For open-ended general knowledge/open-ended questions, the Inventors prompted users by using the most highly rated question-types/formats in order of effectiveness (see FIG. 1A), i.e.: "Where" type/format questions, "What" type/format questions, "When" type/format questions, "Who" type/format questions, and "How" type/format questions. The Inventors left out "Why" type/format questions since, as discussed above, "Why" type/format questions often lead to "unanswerable" or rhetorical questions.

The second experience prototype, and associated question transformation interface screen, the Inventors explored is shown in FIG. 2B and is referred to as the question optimizer approach. One example of one embodiment of the question optimizer approach is the Question Optimizer™ used by Intuit Inc. of Mountain View, Calif. The question optimizer experience prototype, and associated question transformation interface screen, of FIG. 2B allows the user to formulate/phrase a question first, then the user is provided the format transformation/question reformation instructions advising the user on how to re-phrase/transform an improperly formatted question into a properly formatted question. The question optimizer experience prototype, and associated question transformation interface screen, of FIG. 2B thus provides contextual cues to the user to help the user re-phrase the question in such a way as to achieve the highest predicted level of satisfaction with any answer to that question using the data of FIG. 1A. Using the one embodiment of the question optimizer experience prototype, and associated question transformation interface screen, of FIG. 2B, users are asked to retype their question rather than edit the question. Research confirmed that this approach helps the users re-phrase the question more effectively.

One advantage of the question optimizer experience prototype, and associated question transformation interface screen, of FIG. 2B is that initial question data inputs from the user can be analyzed pro-actively in real time. In most cases, the question type/format could be reliably detected from the first few characters/tokens/text of the question entered, as the question was being entered. The intervention accomplished through the question optimizer experience prototype, and associated question transformation interface screen, of FIG. 2B may therefore come at the very early stages of question formulation, alleviating the user's concern about accidentally losing the question before it is submitted to/recorded in the AXC customer support question and answer database.

To test the question optimizer experience prototype, and associated question transformation interface screen, approach of FIG. 2B, the Inventors used 40 AXC "Why" type/format questions belonging to the bottom 10% question quality. The study participants were Intuit™ employees and Peet's Coffee & Tea™ customers who were shown the "Why" formatted questions inside the question optimizer experience prototype, and associated question transformation interface screen, of FIG. 2B. Samples of the original and re-phrased questions are shown in the following Examples 1, 2 and 3.

Example 1—Transformation from "Why" Type/Format Question to "What" Type/Format Question Original Question: I don't understand why I can't efile"

Re-Phrased Question: "What steps do I need to take to efile?"

Example 2—Transformation from "Why" Type/Format Question to Closed-Ended Type/Format Question Original Question: "why is my debit card being declined"
Re-Phrased Question: "My Debit card has been declined. Is there something I need to do to make it work?"

Example 3: —Transformation from "Why" Type/Format Question to "How" Type/Format Question Original Question: "why does the program freeze up when I try to download a state?"
Re-Phrased Question: "When I try to download a stat the program is freezing. How can I fix it?"

The overall success rate of the question optimizer experience prototype, and associated question transformation interface screen, of FIG. 2B, i.e., the ability of the user to transform a "Why" type/format question to another, preferred, question type/format was 80%. What was especially encouraging is that some users were able to re-phrase "Why" type/format questions into closed-ended category questions (Example 2) while keeping the original intent of the question intact. This allows us to accomplish stated Goal 1, i.e., transforming "Why" and "How" type/formatted questions into to closed-ended category/formatted questions.

In addition, in most cases, the questions transformed/re-phrased using the question optimizer experience prototype, and associated question transformation interface screen, of FIG. 2B, became easier to understand and "answerable." This allows us to accomplish stated Goal 2, i.e., transforming "unanswerable" questions into "answerable" questions.

In addition, re-phrasing/transforming using the question optimizer experience prototype, and associated question transformation interface screen, of FIG. 2B, typically resulted in better formed/formatted questions compared to the original question, including proper spelling, grammar structure, capitalization and punctuation. This allows us to accomplish stated Goal 3, i.e., transforming ill-formed questions into "well formed" questions.

In another experiment, the Inventors also found that users who were asked to re-type the question using the question optimizer experience prototype, and associated question transformation interface screen, of FIG. 2B, generally did a better job in re-phrasing the original question. On the contrary, users who were asked to edit the original question typically kept the original question type intact.

The third experience prototype, and associated question transformation interface screen, the Inventors explored is shown in FIG. 2C which abandons the need to choose between general knowledge/open-ended or closed-ended type/format questions upfront. This allows the user to submit/document their question, and then with that task complete, move on to optimizing/transforming it. The experience prototype, and associated question transformation interface screen, of FIG. 2C also introduces the concept of a visual question quality indicator 201, which provides a simpler read of question-quality. Research indicates/demonstrates that users will be more interested in-rephrasing/transforming their question multiple times in a quest to get the meter "into the green."

The benefits of the data driven AXC question-asking experience, and the resulting method and system for proactively improving answer content in a question and answer based customer support system disclosed herein, are multifold. Better-formulated questions improve overall user experience and increase chances of receiving better answers contributing to the user satisfaction. More importantly, new questions will be both more relevant and higher quality for the 98.5% of customers who are searching users that leverage existing answers.

The data analysis discussed above provides a compelling argument for the idea that the quality of an answer can be determined by analyzing attributes of a question and that re-phrasing general knowledge/open-ended questions to closed-ended questions will result in higher quality question and answer based customer support system content, thus providing higher satisfaction for both the asking and searching user. These techniques can also be applied in the method and system for determining a level of popularity of submission content, according to one embodiment.

In addition to identifying attributes of questions that are more likely to result in up votes over down votes, the Inventors have identified attributes of submission content that determines the popularity of the submission content that is posted to the question and answer customer support system. As used herein, submission content includes a question summary and question details, and the term "submission content" is used interchangeably with the term "question". As used herein, a "post" is used to refer to a publicized or published version of the submission content, and may include comments and/or answers submitted by users in response to publicizing, publishing, hosting, and/or posting the submission content. As used herein, the popularity of the submission content refers to the relative ranking of views and/or of votes received by submission content. By determining/predicting and selectively manipulating the popularity of submission content, AXC contributes to the accomplishment of various business goals, such as, but not limited to, increasing conversions of potential customers to paying customers; decreasing live support costs; and attracting potential customers to products and services, e.g., TurboTax, offered by the service provider. As described above, AXC may be configured to analyze submission content attributes (e.g., question attributes) to determine the likelihood of the submission content receiving an up vote or a down vote. However, just because the submission content is likely to receive an up vote, does not necessarily mean that the submission content is likely to be popular. Furthermore, just because the submission content is likely to receive a down vote, does not necessarily mean that the submission content is likely to be unpopular. By determining/predicting the popularity of submission content, AXC may be configured to automatically assist a user in altering submission content (e.g., modify the question-asking experience) so that the submission content is likely to be more popular or less popular, depending upon the impact that the submission content is predicted to have on the users of AXC.

Figure 3A:
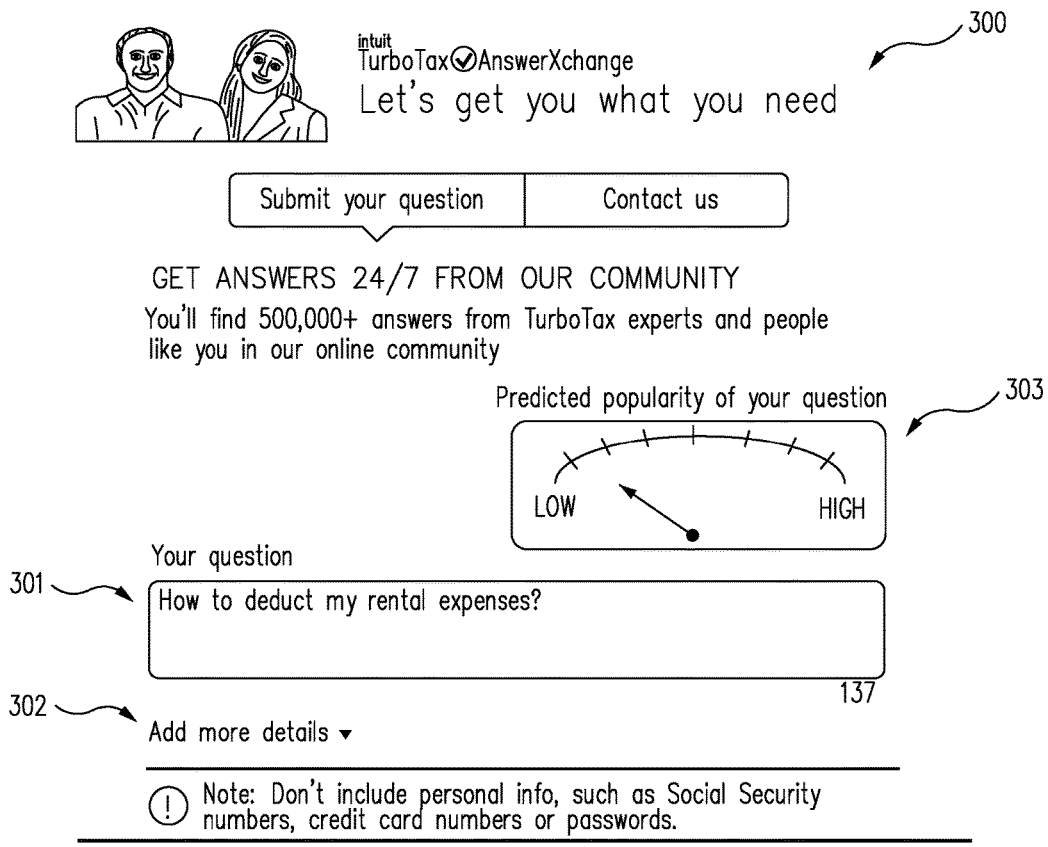
FIG. 3A is an illustrative example of an interface screen used to receive submission content from a user and that includes a question popularity indicator in accordance with one embodiment.

FIG. 3A illustrates an example of a user interface 300 that can be used by AXC to acquire submission content from an asking user, according to one embodiment. The user interface 300 includes a question summary interface element 301 and a question details interface element 302 for acquiring submission content from an asking user, according to one embodiment. The question summary interface element 301 receives a question summary from a user which is a character-limited question for which an asking user seeks a response. The question details interface element 302 enables the user to submit various additional details, without character limitations, that further describe the circumstances surrounding the asking user's situation and question.

The user interface 300 includes a visual question popularity indicator 303 that provides an indication to an asking user of what the current projected, estimated, or predicted popularity of their question is, according to one embodiment. The visual question popularity indicator provides an easily understood indication of question popularity. The illustrated embodiment is a needle indicator that is configured to move from low to high as the user enters and/or modifies the question summary and/or the question details, according to one embodiment. The visual question popularity indicator can include color coding so that it changes from a first color to one or more other colors as the question gains or loses popularity. Various other user interface elements can be implemented to indicate levels of popularity as the user is formulating or revising the submission content (e.g., the question summary and/or the question details), according to various embodiment. Example embodiments include, but are not limited to, meter displays, line displays, score displays, digital displays, analog-simulating displays, audio content, visual content, images, backgrounds, avatars, highlighting mechanisms, icons, and any other features that individually, or in combination, relay to a user a determined popularity of a question being submitted, before the question is publically posted for review, response, and/or comment, according to one embodiment.

Figure 3B:
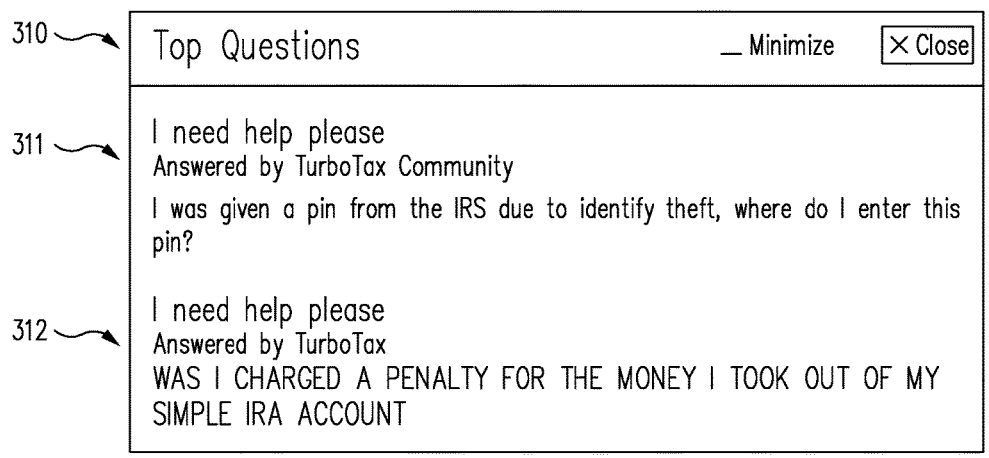
FIG. 3B is an illustrative example of an interface screen used to display search results of publicized submission content, i.e., posts, in accordance with one embodiment.

FIG. 3B illustrates an example of a user interface 310 that can be used by AXC to display search results of publicized submission content, i.e. posts, such as submission content 311 and submission content 312, which include a question summary and question details. The user interface 310 displays partial results of a search query "I need help". In the illustrated example, the question summary for submission content 311 is "I need help please," and the question details for the submission content 311 is "I was given a pin from the IRS due to identity theft, where do I enter this pin?" The question summary for submission content 312 is "I need help please," and the question details for the submission content 312 is "WAS I CHARGED A PENALTY FOR THE MONEY I TOOK OUT OF MY SIMPLE IRA ACCOUNT". The question summary and the question details for each submission content is used by various search engines to match queries from searching users with submission content (e.g., questions) submitted to AXC by asking users.

There are at least three ways for users to view or be directed to AXC content, according to various embodiments. Authenticated (e.g., registered online with a username and/or password) users typically consume content when it is shown in response to the user search queries inside products that are associated with AXC, e.g., TurboTax Online. Non-authenticated users working with TurboTax desktop versions typically see content shown at the AXC landing page (http (colon)//ttlc (dot) intuit (dot) com). Other users are directed to AXC content as a result of a search engine query, e.g., performed using Google and/or one or more other search engines. View and vote statistics for posts are recorded by all three channels and are subsequently used by popularity scoring algorithms (e.g., analytics and/or predictive models) when boosting content served by the AXC search engine or as part of the Google search engine optimization process, according to one embodiment. For example, TurboTax users who are dissatisfied with TurboTax prices may vote the related AXC content down, which may have the effect of reducing Google traffic to that particular AXC post, according to one embodiment. In short, user search patterns and user click patterns inside TurboTax may affect click patterns directed towards AXC content shown by Google and vice versa.

Figure 4A:
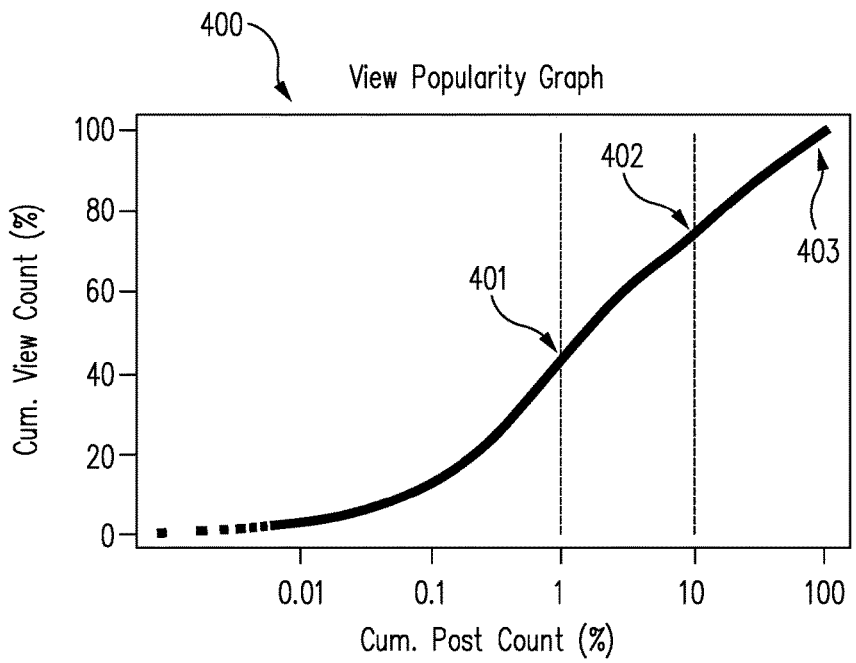
FIGS. 4A and 4B are illustrative examples of graphs related to view and vote characteristics of posts to a question and answer customer support system in accordance with one embodiment.
Figure 4B:
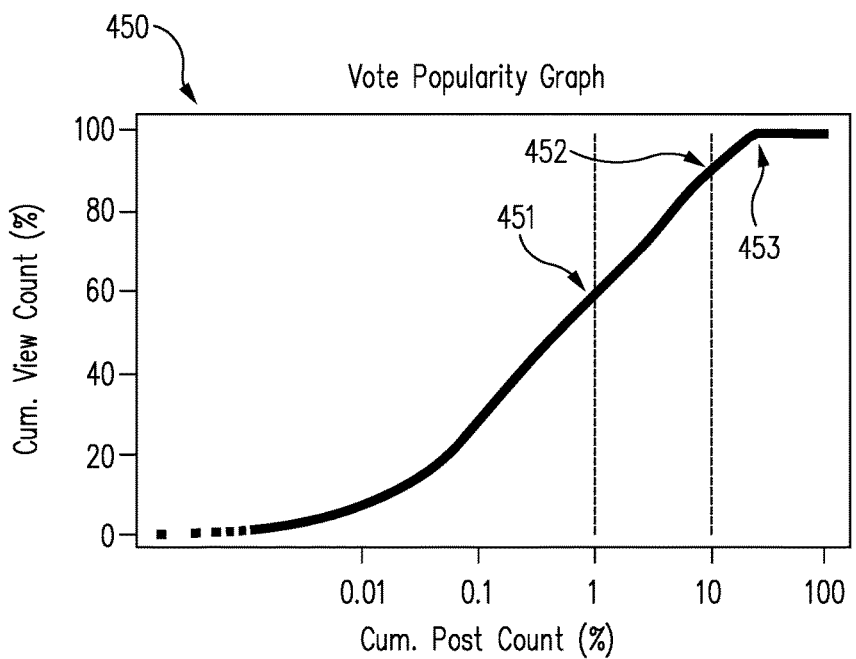

FIGS. 4A and 4B illustrate a view popularity graph 400 and a vote popularity graph 450 for cumulative post counts from AXC data created from Jan. 1, 2014 to Apr. 15, 2014, i.e., during the period of the highest user activity in 2014. The view popularity graph 400 includes cumulative counts of AXC views for the answered (62.6%) and unanswered (37.4%) posts created from Jan. 1, 2014 to Apr. 15, 2014. Overall, 556,000 posts were included in the analysis. As seen in the view popularity graph 400, graph coordinate 401 shows that 1% (i.e., the top 1%) of all AXC posts received approximately 40% of all AXC views in 2014. Graph coordinate 402 shows that 10% (i.e., the top 10%) of all AXC posts received approximately 70% of all views in 2014. The small percentages of AXC posts are referred to as the most popular AXC posts because of the concentration of views these posts received relative to all other available posts. Various classes of popularity can be defined, such as, the top 1%, the top 5%, the top 10%, the top 20%, etc., and the classes can be used to filter the content provided to AXC users to accomplish the previously noted business-related objectives. Referring back to view popularity graph 400, graph coordinate 403 shows that the bottom 10% of posts, ranked by the number of views, received just 0.5% of all AXC views in 2014, most of which originate from the asking users of the questions. The average number of views per post was 42.5 views, and any post with more than 64 views was in the top 10% of all AXC views in 2014.

The vote popularity graph 450 includes cumulative counts of AXC views for the answered (62.6%) and unanswered (37.4%) posts created from Jan. 1, 2014 to Apr. 15, 2014. Overall, 556,000 posts were included in the analysis. As seen in the vote popularity graph 450, graph coordinate 451 shows that 1% (i.e., the top 1%) of all AXC posts received approximately 60% of all AXC votes in 2014. Graph coordinate 452 shows that 10% (i.e., the top 10%) of all AXC posts received approximately 90% of all views in 2014. The small percentages of AXC posts are referred to as the most popular AXC posts because of the concentration of votes these posts received relative to all other available posts. Various classes of popularity can be defined, such as, the top 1%, the top 5%, the top 10%, the top 20%, etc., and the classes can be used to filter the content provided to AXC users to accomplish the previously noted business-related objectives. Referring back to vote popularity graph 450, graph coordinate 453 shows that approximately 74% (i.e., the bottom 74%) of posts, ranked by the number of votes, did not receive any AXC votes in 2014. In 2014, the average number of votes per post was 1.42.

The extreme or drastic concentration of views and votes on a limited quantity of total submissions/posts highlights or underscores the potential importance or influence that a popular high quality or a popular low-quality post (inclusive of an answer) can have on the reputation of AXC and the service provider. For example, if multiple question submissions are very likely to have low quality answers (based on the attributes of the questions), and these questions have attributes that make them highly popular, then searching users who are directed to low-quality answers/content may receive the misconception that the content of AXC is junk or is not relevant to them. Searching users who determined that the help system, e.g., for TurboTax, is not helpful may decide to use live customer support, may decide not to use tax return preparation services associated with AXC, and/or may publicly express disgruntled opinions about AXC or its associated tax return preparation systems/services.

When predicting the expected popularity of submission content, it is helpful to switch from using regression techniques (e.g., by predicting an absolute number of views or rank of the post as measured by views) to a classification technique (e.g., by predicting whether submission content belongs to the 10% of the most popular posts by the number of views). In other words, instead of predicting one out of hundreds or thousands of possible ranks, using a binary or finite categorical judgment is computationally more efficient. The question then becomes "is this post in the top 10% or not", rather than "what is the rank of this post among all posts". Logistic regression is a particular form of regression, in which one predicts the probability that an item belongs in one of two categories (e.g., top 10% or bottom 90%). Because logistic regression output (e.g., popularity scores) range from 0 to 1, thresholds can be applied to the output as an empirically established float number to produce class predictions. Similar techniques can be used when predicting a likelihood of a user giving an up vote or a down vote to submission content. Because the requirements for a binary distinction are generally weaker than the requirements for predicting ranks using classification techniques, use of classification techniques typically results in better performance. In other words, using classification techniques is more computationally efficient than using regression techniques, so use of classification techniques typically results in better performance.

Figure 5:
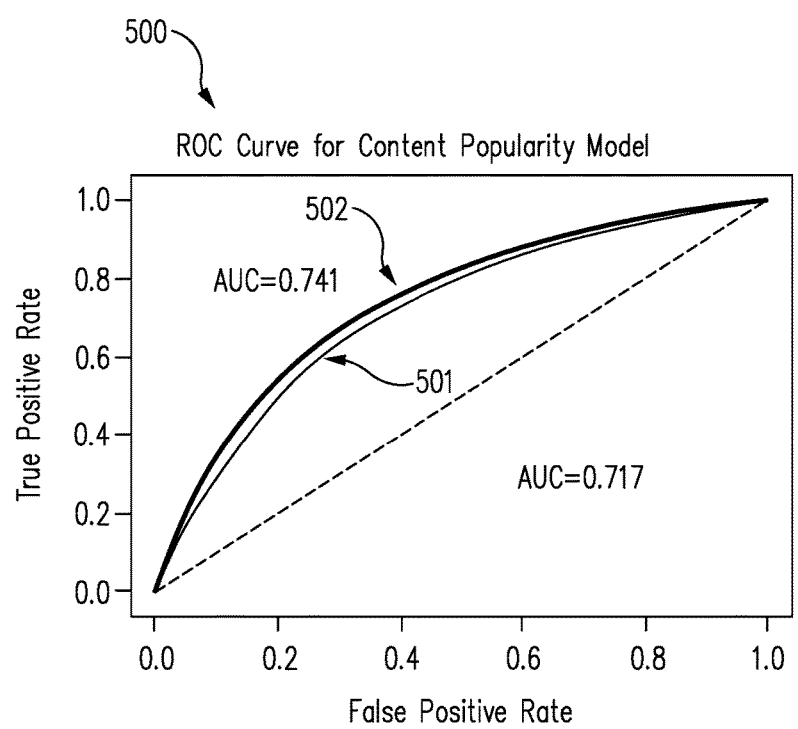
FIG. 5 is an illustrative example of a graph of operating characteristics for an analytics model that predicts the popularity of content in a question and answer customer support system in accordance with one embodiment.

FIG. 5 is a receiver operating characteristics ("ROC") curve 500 for a content popularity model and shows area under the curve ("AUC") values for the content popularity model. The ROC curve 500 includes a first curve 501 and a second curve 502. The first curve 501 represents the response of the content popularity model that is trained with the attributes of question summaries (e.g., see submission content 311 of FIG. 3A). The second curve 502 represents the response of the content popularity model that is trained with the attributes of question summaries and trained with the attributes of question details. The true positive rates of the second curve 502 are higher than most of the true positive rates of the first curve 501 for any given false positive rate. Thus, the second curve 502 indicates that the content popularity model that is trained with attributes of both question summaries and question details operates better than the content popularity model that operates with just the attributes of the question summaries. The AUC values also support this conclusion because the AUC value for the second curve 502 (AUC=0.741) is greater than the AUC value for the first curve 501 (AUC=0.717).

Some attributes of submission content or posts have a greater influence on the popularity of the submission content or posts than other attributes. The Inventors determined that the most determinative attribute of the content popularity models is question details. It was determined that the AXC posts that included question details received twice as many views (on average) than the posts without question details. The second most determinative attribute is the length of the question summary, measured in number of characters. Submission content or posts having longer question summaries are less likely to become popular and vice-versa. The third most determinative attribute is the first token of the question subject. The first tokens can be included as categorical variables or grouped and included as the binary "declarative" ("I", "my" and "we") or "interrogative" ("are", "does", "can", "is") attributes. Adding answer attributes to the model or accounting for seasonal patterns in user traffic do not result in noticeable improvements in the performance. In fact, the Lucene ranking algorithm employed by AXC tends to boost new content.

The operation of ranking algorithms, such as the Lucene ranking algorithm, explains the inverse relationship between length of question summary and level of popularity for a post. Search results are more relevant if search query keywords are more frequent in a document or other searched text. A concept known as "tf-idf" weighting causes a shorter question summary with the same set of matching keywords to be a stronger match than a longer question summary having the same semantic meaning. A typical AXC search query is 2-3 terms long, which is much shorter than a typical AXC question summary, so a shorter question summary that includes the terms of the search query will be determined to be a stronger match than a longer question summary that includes less relevant terms in addition to the search terms. The effect of question details of posts is similar in that posts with question details receive an extra boost from the Lucene ranking algorithm and are therefore more likely to be shown at the top of the search results. The content shown in question details seems to play a minor role on the popularity of posts, and attention patterns in online forums have been shown to focus mostly on post titles, like the question summaries of submission content.

Figure 6:
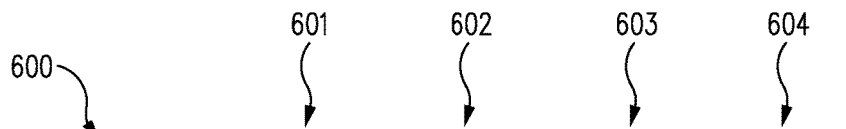
FIG. 6 is an illustrative example of a table of relationships between the attributes of question summaries and the popularity of submission content or posts in accordance with one embodiment.

As discussed above, the first token of the question subject of submission content is the third most determinative attribute in predicting or identifying the popularity of submission content. FIG. 6 includes a table 600 that illustrates relationships between question summary attributes and the popularity of a post, according to one embodiment. The table 600 includes the 20 most frequent first tokens of the question summaries for 556,000 posts. The natural language processing used for the analysis included (1) splitting "I'm" to "I" and "am", (2) merging "Turbo" and "Tax" into a single term, and (3) down-casing all characters. The percentages reported in the table 600 account for 75% of the posts. The most frequent token is "I", and is present in more than 25% of the posts. The next most frequent tokens are the "knowledge" question words "how" and "why". The popularity of the post is measured by both the average number of views and/or by the probability for the post to be in the top 10% of the most viewed and/or most voted-on posts. Both quantities are well correlated (Pearson's r=0.897, Spearman's p=0.957), with the only exception being "does" because "does" has the highest average number of views for any group. This appears to be a statistical aberration since two posts starting with "does" in the data set were in the top 10 most popular AXC posts in 2014. The table 600 includes five columns. The first column 601 represents the percentages of all posts. The second column 602 represents average views for a posts beginning with a particular token. The third column 603 represents percentages of posts in the top 10% of the most popular posts. The fourth column 604 represents the question answer rate. The third column 603 (percentages of posts in the top 10% of the most popular posts) and the fourth column 604 (answer rate) are also correlated (Pearson's r=0.660, Spearman's p=0.715). The answer rate dependence on the first token of the subject may reflect contributors' bias in selecting a question for answering, but the answer rate does not vary with the same magnitude as popularity.

As illustrated in table 600, the question subjects starting with "why" are almost half as popular as the average. This is good news from the AXC perspective because answers to "why" questions are more frequently voted down than other questions. With the exception of "why" and "when", which often indicate a rhetorical question type, the question summaries that begin with the interrogative pronouns "where", "what" and "how" ("knowledge" questions) and with the auxiliary verbs "are", "does", "can", "is" ("closed-ended" questions) are more likely than average to become popular. Conversely, "declarative" subjects starting with "I", "my" and "we" are less likely than average to become popular.

The tokens of table 600 have very little impact on algorithmic searches of the question summary, so the relationship between the tokens and the popularity (e.g., the third column 603) appears to be based on human preference. Search algorithms and search engines use stop words to improve the relevance of searches. 19 out of 20 tokens included in table 600 are typical stop words. The only exception is "TurboTax", which is one of the most frequent keywords in the AnswerXchange posts. Note that stop words (as any frequent terms in the document) are often discarded by the Lucene search engine. A typical AXC user spends 2-3 seconds reading a search result snippet and mostly focuses on the left top corner (a web marketing concept known as "Google golden triangle"). In this way, the user's impression of the first few words of the question summary (e.g., as shown in FIG. 3B) seems to play a critical role in the user's intent to read the entire post. One explanation of the results shown in table 600 is that AXC users are less interested in the content specific to somebody's experience (as revealed by the first person pronouns) and tend to skip search results having first person tokens. Psycholinguistic studies confirm that human attentional focus largely depends on the pronoun usage.

DETAILED DISCLOSURE

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In one embodiment a software system is provided. As noted above, herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment a question and answer based customer support system, e.g., a social question and answer (Q&A) system, is provided to support users of the software system.

In one embodiment, the question and answer based customer support system serves as a discussion forum in an area of endeavor related to the software system. As an illustrative example, in one embodiment, the question and answer based customer support system is provided to support a tax preparation software system and therefore the discussion forum is related to "federal and state taxation and tax preparation."

In one embodiment, users of the software system are provided the capability to submit questions regarding the installation, implementation, use and operation of the software system through the question and answer based customer support system.

In one embodiment, the question and answer based customer support system includes a support community of customer support personnel. In one embodiment, the customer support personnel include paid support personnel in the employ of the provider of the software system and non-paid volunteer expert users of the software system. In one embodiment, the volunteer expert users of the software system are identified and certified by the provider of the software system.

In one embodiment, through the question and answer based customer support system, users of the software system are provided the capability to submit questions to members of the support community of customer support personnel.

In one embodiment, questions submitted to the question and answer based customer support system can be related to very different broad categories, be of various question types, have varying predicted answer lengths, and be formatted in various different ways. For example, some questions submitted to the question and answer based customer support system are product related questions, e.g., questions related to pricing, installation, version choice, etc. for the software systems that often have little or no relation to the subject matter/job of the software system, i.e., the endeavor supported by the software system. On the other hand, some questions submitted to the question and answer based customer support system are subject matter related, or substantive, questions directly related to the subject matter/endeavor of the software system.

As an illustrative example, in the case of a tax preparation software system, the questions "What version of the tax preparation software system should I use?" or "How do I install the tax preparation software system?" would be product related questions while the questions "Can I deduct my computer?" or "What is my adjusted gross income?" would be subject matter related questions.

In general, product related questions are best answered by paid support personnel in the employ of the provider of the software system while subject matter related questions are often best answered by volunteer expert users of the software system. Consequently, in one embodiment, it is desirable to identify the broad category/subject matter of the questions, e.g., product related questions and subject matter related questions, and route the questions accordingly either to support personnel or volunteer expert users of the software system. As disclosed here, the user interface elements or a mobile device user interface are configured/customized to facilitate answering subject matter related questions by volunteer expert users of the software system, according to one embodiment.

In one embodiment, the question and answer based customer support system is used to generate reusable content for the question and answer based customer support system, e.g., the question and answer based customer support system is used to generate a customer support question and answer database. In one embodiment, the creation of the customer support question and answer database is the primary goal of the question and answer based customer support system. This is because it has been empirically demonstrated that only 1.5% of users of a typical question and answer based customer support system are asking users who submit their own questions, while the remaining 98.5% of users are searching users who look for answers by searching for similar topics and questions answered in the customer support question and answer database.

As discussed below in more detail, questions submitted to the question and answer based customer support system can also be structured/formatted in a variety of ways and these various question type/formats can vary significantly in quality, length, and effort needed to answer the question.

As a specific illustrative example, questions submitted to the question and answer based customer support system can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "Yes" or "No", or via a multi-choice, or mapping. These question structures/formats are analyzed and used for facilitating the production of answer content for the customer support system, according to one embodiment.

In one embodiment, closed-ended category questions are identified/defined. The closed-ended formatted questions are placed in the sub-category of "Yes/No" type questions or multiple-choice questions. These "Yes/No" type questions typically start with an auxiliary verb such as "Do", "Can", "Be." As indicated by the name, the "Yes/No" type questions can be answered by a "Yes" or "No" answer. A specific illustrative example of a "Yes/No" question would be: "Can I deduct my computer?" with the possible answers "Yes, you can" or "No, you can't."

The second sub-category of closed-ended question format includes "Choice" type questions. "Choice" type questions generally start with an auxiliary verb as well, but also contain the conjunction "or." Consequently, "Choice" type questions usually result in a multiple choice answer embedded in the body of the question. A specific illustrative example of a "Choice" type question would be "Should I install X or Y version?" with the possible answers "You need to install Y," "You need to install X," "You need to install either X or Y," "You need to install neither X or Y."

As seen in FIG. 1A, closed-ended questions result in an impressive 85.9% up vote, i.e., 85.9% of users who submit questions in the closed-ended format are satisfied with the answer provided. As also seen in FIG. 1A this is the highest satisfaction rating of all question formats. Furthermore, closed-ended questions that are "Yes/No" type questions and/or "Choice" type questions are extraordinarily easy for customer support personnel to respond to. When customer support personnel received/review "Yes/No" type questions and/or "Choice" type questions, if the customer support personnel know the answer, they can respond from their mobile devices in a matter of minutes, if not seconds. Thus, routing close-ended questions that are "Yes/No" type questions and/or "Choice" type questions to the front of a question and answer queue or routing these questions ahead of more complex questions enables the question and answer based customer support system to leverage the available time and the mobile resources of voluntary customer support personnel in reducing/managing the size of a question and answer queue, according to one embodiment.

In one embodiment, if a question submitted to the question and answer based customer support system is deemed to be neither a general knowledge/open-ended nor a closed-ended format question, the question is classified as being in the ill-formed question category by default. Many of the ill-formed category questions do not follow a grammatically correct question format either intentionally, as in the case of a search query type, or unintentionally, e.g., wrong grammar, punctuation, etc.

"How" and "Why" question formats are detectable with format analysis instructions that implement regular expressions analysis. Similarly "When", "Where" and "Who" question formats are detectable with format analysis instructions that implement regular expressions analysis, however, the analysis is slightly more involved as it typically requires part-of-speech tagging to avoid confusion with relative adverbs and relative pronouns. As seen in FIG. 1A these question types are less common in question and answer based customer support systems. More exotic question types such as "tag questions," "leading questions," and "embedded questions" are extremely rare in question and answer based customer support systems, and therefore are largely excluded from analysis.

In one embodiment, user profile data indicating various user attributes is obtained. In one embodiment, the user profile data includes data obtained from other software systems used by the user and the resulting user profile data is shared with, or linked to, two or more software systems. In one embodiment, the user profile data is used to train the one or more analytics (e.g., predictive) models to determine the likelihood that a user will be more satisfied or less satisfied with a good answer when a predetermined stimulus or attribute is added to the answer.

As a specific illustrative example, in one embodiment, user historical data is obtained from the provided software system and/or associated question and answer based customer support system. In contrast, user profile data can be obtained from the provided software system and/or associated question and answer based customer support system, such as, for example, a tax preparation software system used by the user, and/or another software system and/or associated question and answer based customer support system, such as, for example, a personal financial management system used by the same user.

In one embodiment, questions submitted to the question and answer based customer support system by asking users, i.e., users submitting new questions, are meant to be answered by members of the support community of customer support personnel.

In various embodiments, the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

As noted above, questions submitted to the question and answer based customer support system can be formulated in a variety of ways, directed to various broad categories/subjects, and be submitted in various question formats representing various question types.

In one embodiment, as the question data is being entered by a user, and/or is otherwise received, the question data is parsed and analyzed before providing the question data to any of the one or more support personnel. As noted above, in one embodiment, questions submitted to the question and answer based customer support system by asking users are meant to be answered by members of the support community of customer support personnel. However, using the methods and systems disclosed herein, the question data is parsed and analyzed before providing the question data to any of the one or more support personnel to determine if a particular stimulus or answer attribute can be added or omitted from the answer to improve the likelihood that a user will be satisfied with the answer and/or to decrease the likelihood that a user will be dissatisfied with the answer.

Process

Figure 7:
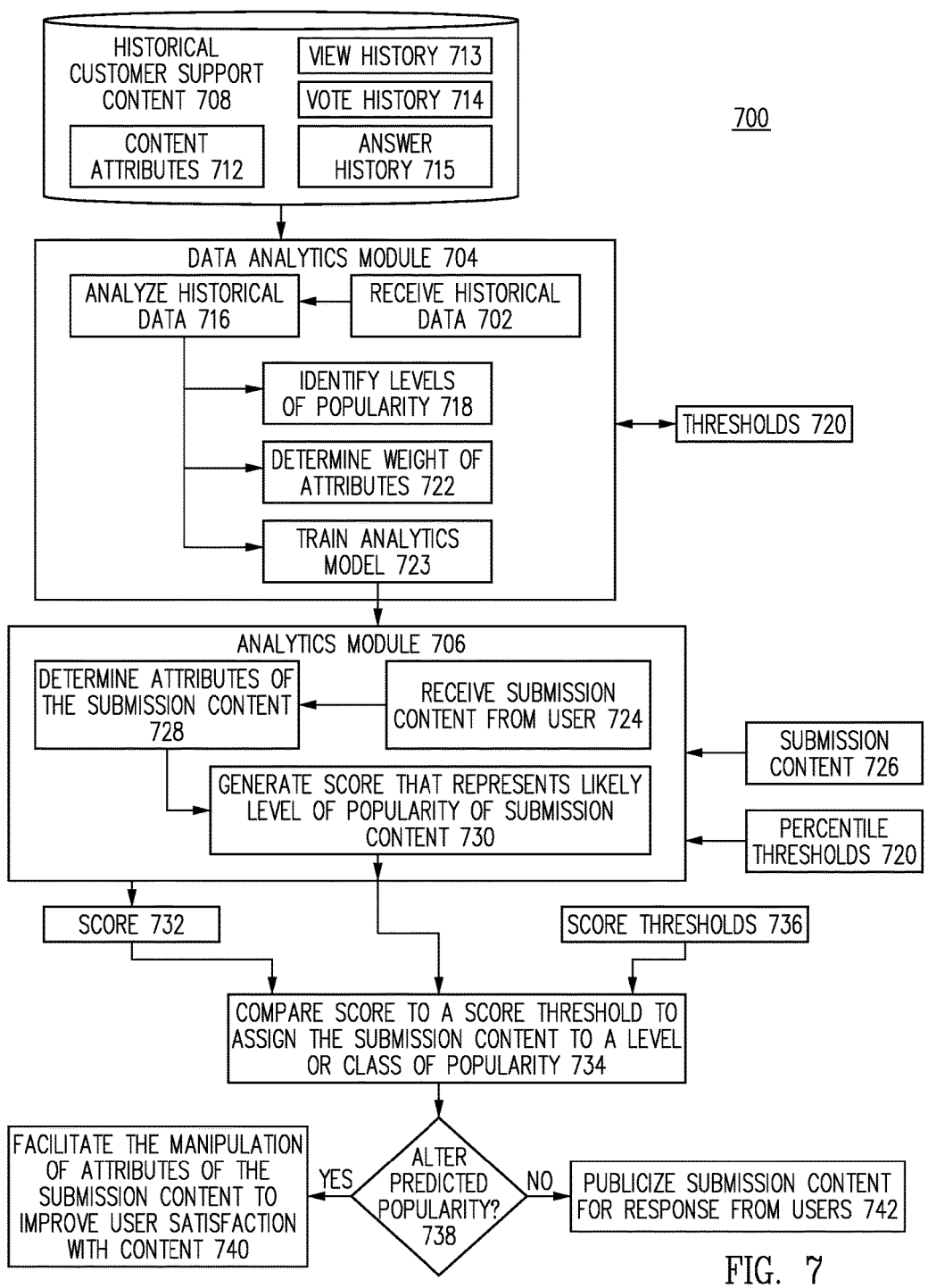
FIG. 7 is an illustrative example of a flow diagram representing one example of a generalized process for determining a level of popularity of submission content, prior to publicizing or posting the submission content with a question and answer customer support system in accordance with one embodiment.

FIG. 7 is a flow diagram representing one example of a process 700 for determining a level of popularity of submission content, prior to publicizing or posting the submission content with a question and answer customer support system, to improve user satisfaction with content of the question and answer customer support system, according to one embodiment. The question and answer customer support system uses the analytics (e.g., predictive) model to determine the likely level of popularity for submission content (inclusive of a question summary and question details), e.g., the likelihood that users will view and/or vote on the submission content. The question and answer customer support system alters submission content or suggests alterations for submission content to improve the likelihood that high-quality answers will be seen by multiple users and to decrease the likelihood that low-quality answers will be seen by multiple users. By predicting and manipulating the likely level of popularity for submission content, the question and answer customer support system can improve the perceived quality of content in the question and answer customer support system, which may have the effect of increased conversions of potential customers to paying customers, less requests for live support, and increases in potential customers being directed to the question and answer customer support system.

At operation 702, a data analysis module 704 receives historical data, to support training an analytics model 706, according to one embodiment. The historical data includes historical customer support content 708, according to one embodiment. The historical customer support content 708 includes submission content, comments, answers, view history, and vote history saved and maintained by the question and answer based customer support system. In one embodiment, the historical customer support content 708 is maintained in one or more databases that are updated with posts, comments, answers, views and votes for submission content, according to one embodiment. The historical customer support content 708 includes content attributes 712. The content attributes 712 include, but are not limited to, question summary, character length of question summary, question details, character length of the question details, first tokens associated with question summaries, and the like. The historical customer support content 708 also includes view history 713, vote history 714, and answer history 715, for the submission content and/or posts stored and maintained by the historical customer support content 708, according to one embodiment. The view history 713 represents the number of views received by each post to the question and answer customer support system. The vote history 714 represents the number of votes (positive, negative, and null) received by each post to the question and answer customer support system. The answer history 715 represents whether or not a post received an answer, and represents whether the answer was a high-quality answer or a low-quality answer, at least partially based on the vote history 714, according to one embodiment.

At operation 716, the data analysis module 704 analyzes the historical data, according to one embodiment. Analyzing the historical data, e.g., the historical customer support content 708, includes applying one or more algorithms to the historical data, according to one embodiment. The data analysis module 704 applies regression, generalized regression, logistic regression, multinomial regression, decision trees, artificial neural networks, support vector machines, linear regression, nearest neighbor methods, distance based methods, naive Bayes, linear discriminant analysis, k-nearest neighbor algorithm, or another mathematical, statistical, logical, or relational algorithm to determine correlations or other relationships between the content attributes 712, view history 713, vote history 714, answer history 715 associated with the submission content and posts that are stored and maintained in the historical customer support content 708, according to one embodiment. As illustrated in FIGS. 5 and 6 (and the associated description), analyzing historical data enables the analytics model 706 and the question and answer customer support system to determine, identify, and/or predict likely levels of popularity for submission content (e.g., questions), at least partially based on the content attributes 712 (e.g., character length of question summary, character length of question details, and first token of the question summary), according one embodiment.

At operation 718, the data analysis module 704 identifies levels of popularity, according to one embodiment. Levels of popularity or classes of popularity segregate different segments of posts by levels or classes of popularity. The data analysis module 704 can be configured to define two or more individual levels or classes/classifications of popularity. The individual levels or classes of popularity can be used to identify groups of posts within a data set of posts, e.g., all posts ever hosted by the question and answer customer support system, according to one embodiment. An example of two individual levels or classes of popularity can be the 10% most popular posts and the 90% least popular posts. An example of three individual levels or classes of popularity can include the top 1% most popular posts, the top 10% most popular posts, and the bottom 90% least popular posts (i.e., all other posts), according to one embodiment. Various additional levels of classes of popularity can be defined, for example, using the percentile thresholds 720, according to one embodiment. In one embodiment, the data analysis module 704 receives the percentile thresholds 720, e.g., top 1%, top 5%, top 10%, etc. and applies the thresholds to the historical data during analysis of the historical data.

At operation 722, the data analysis module 704 can be configured to determine the weight of the attributes of the historical content. For example, using the view history 713, the vote history 714, and/or the answer history 715, the data analysis module 704 may determine that character length of question details of submission content, character length of a question summary of submission content, and the first token of the question summary of submission content are the most dominant attributes in predicting the popularity of submission content, e.g., a question, according to one embodiment. In one embodiment, the data analysis module 704 further ranks, prioritizes, or weights the dominant attributes. For example, the data analysis module 704 may determine that the character length of question details is more dominant and the character length of a question summary of submission content, which are both more dominant than the first token of the question summary of submission content. In one embodiment, the data analysis module 704 ranks or sorts the dominance of various available first tokens, to further facilitate the determination/prediction of popularity of submission content, according to one embodiment.

At operation 723, the data analysis module 704 trains the analytics model 706, according to one embodiment. Training the analytics model 706 can include, but is not limited to, defining and/or identifying correlations or other mathematical, statistical, or logical relationships between one or more attributes of submission content or posts and the likely level of popularity of the submission content or posts, according to one embodiment. In one embodiment, the analytics model 706 is a predictive model configured to estimate or predict the likelihood of a future output, e.g., like the likelihood of submission content being in the top 10% of most popular posts.

At operation 724, the analytics model 706 receives submission content 726 from a user through a user interface, according to one embodiment.

At operation 728, the analytics model 706 determines the attributes of the submission content, according to one embodiment. Examples of attributes that are determined by the analytics model 706 include, but are not limited to, length of characters of the question summary, length of characters of the question details, and the first token of the question summary, according to one embodiment. Some of the attributes are determined to predict the popularity of the submission content, in one embodiment. In another embodiment, the attributes are determined to predict the quality of the question summary and the quality of response that is likely to be received.

At operation 730, the analytics model 706 generates a score 732 that represents a likely level of popularity of the submission content 726, according to one embodiment. For example, the score 732 can represent the likelihood of the submission content being categorized into one of a number of levels or classes of popularity, which may at least partially be defined by the percentile thresholds 720, according to one embodiment. The score 732 can also represent the likelihood that the submission content 726 belongs to a single level or class of popularity, e.g., the top 10% of posts, according to one embodiment.

The popularity of a post or of submission content, as compared to all other posts, may be determined by combining characteristics of one or more attributes of the submission content or post. For example, the popularity may be predicted to be in the top 10% of posts if the estimated average views of submission content is at least 42 and if question summary includes a particular first token, e.g., "can", according to one embodiment.

At operation 734, the question and answer customer support system compares the score 732 to a score threshold 736 to assign the submission content 726 to a level or class of popularity, according to one embodiment. The score 732 is a floating point number in the range of 0 to 1 and is representative of the likelihood that the submission content 726 will achieve a particular level of popularity, according to one embodiment. For example, the score threshold 736 can be set to 0.8, and if the score 732 is greater than or equal to 0.8 then the submission content 726 is predicted to achieve a particular level of popularity, e.g., to be in the top 10% of posts.

At operation 738, the question and answer customer support system determines whether or not to alter the predicted popularity of the submission content 726, according to one embodiment. As discussed above, attributes of submission content (e.g., of the question summary) can be used to predict the likelihood that a response to the submission content will receive an up vote or down vote. If the question and answer customer support system determines that a response to particular submission content is likely to be positive, then the question and answer customer support system can be configured to attempt to increase the predicted popularity of the submission content so that the submission content and its corresponding answer are viewed by as many users as possible. If the question and answer customer support system determines that a response to particular submission content is likely to be negative, then the question and answer customer support system can be configured to attempt to decrease the popularity of the submission content so that the submission content and its corresponding answer are viewed by as few users as possible. If altering the predicted popularity of the submission content 726 will improve user satisfaction with content of the question and answer customer support system, the process proceeds to operation 740, according to one embodiment. If, however, altering the predicted popularity of the submission content 726 will not improve user satisfaction with content of the question and answer customer support system, the process proceeds to operation 742, according to one embodiment.

At operation 740, the question and answer customer support system facilitates the manipulation of attributes of the submission content to improve user satisfaction with the content, according to one embodiment. For example, the question and answer customer support system provides suggestions to a user to alter attributes so as to improve the level or class of popularity of a post, or provide suggestions to the user to alter attributes so as to decrease the level or class of popularity of a post, according to one embodiment. For example, to improve the level or class of popularity of submission content, the question and answer customer support system can recommend adding or increasing the length of question details, shortening or decreasing the length of question summaries, or beginning the question summary with a different first token, e.g., with the first token "can", according to one embodiment. As another example, to decrease the level or class of popularity of submission content, the question and answer customer support system can be configured to delete or omit question details from the submission content prior to publicizing the submission content for public review and consideration. By increasing the likelihood of popularity of high-quality content and by decreasing the likelihood of popularity of low-quality content, the question and answer customer support system improves user satisfaction with the content of the question and answer customer support system, according to one embodiment.

At operation 742, the question and answer customer support system publicizes submission content for response from users, according to one embodiment. If altering the submission content does not contribute to furthering the business objectives of the service provider, the question and answer customer support system simply publicizes the submission content for public review and consideration, according to one embodiment.

The disclosed method and system for determining a level of popularity of submission content (e.g., questions), prior to publicizing the submission content with a question and answer support system, provides for significant improvements to the technical fields of customer support, information dissemination, software implementation, and user experience. In addition, using the disclosed method and system for determining a level of popularity of submission content results in more efficient use of human and non-human resources, fewer processor cycles being utilized, reduced memory utilization, and less communications bandwidth being utilized to relay data to and from backend systems because users are less likely to request live customer support and because using question popularity attributes to direct users to questing that are likely to receive up votes can result in less new questions being submitted to the customer support system. As a result, computing systems are transformed into faster, more efficient, and more effective computing systems by implementing the method and system for determining a level of popularity of submission content, prior to publicizing the submission content with a question and answer support system.

Figure 8:
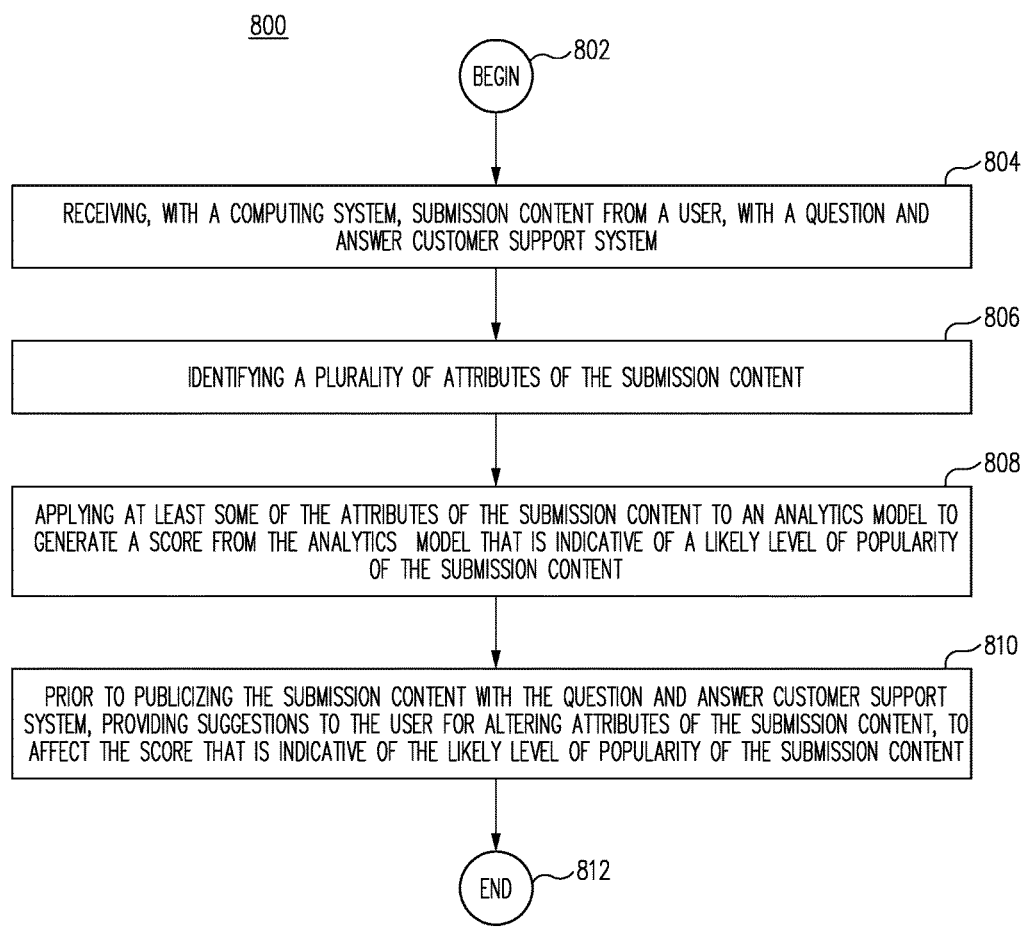
FIG. 8 is an illustrative example of a flow diagram representing one example of a generalized process for determining a level of popularity of submission content, prior to publicizing or posting the submission content with a question and answer customer support system in accordance with one embodiment.

FIG. 8 is a flow chart representing one example of a process 800 for determining a level of popularity of submission content, prior to publicizing the submission content with a question and answer customer support system, to improve user satisfaction with content of the question and answer customer support system, according to one embodiment.

At operation 802, the process begins.

At operation 804, the process includes receiving, with a computing system, submission content from a user, with a question and answer customer support system, according to one embodiment.

At operation 806, the process includes identifying a plurality of attributes of the submission content, according to one embodiment.

At operation 808, the process includes applying at least some of the attributes of the submission content to an analytics model to generate a score from the analytics model that is indicative of a likely level of popularity of the submission content, according to one embodiment.

At operation 810, prior to publicizing the submission content with the question and answer customer support system, the process includes providing suggestions to the user for altering attributes of the submission content, to affect the score that is indicative of the likely level of popularity of the submission content, according to one embodiment.

At operation 812, the process ends.

Hardware Architecture

Figure 9:
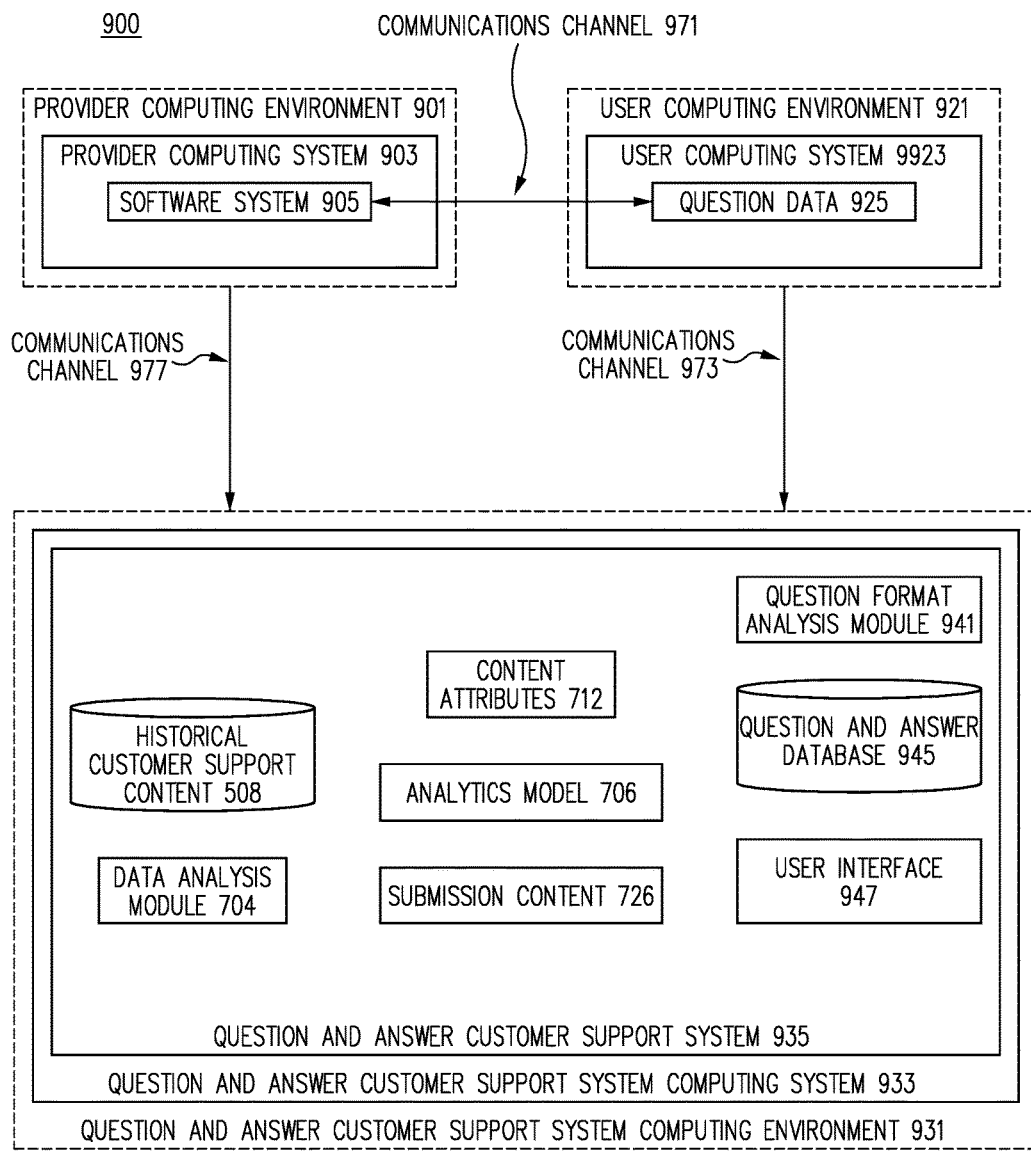
FIG. 9 is a block diagram representing one example of a hardware system and production environment for determining a level of popularity of submission content, prior to publicizing or posting the submission content with a question and answer customer support system in accordance with one embodiment.

FIG. 9 is a block diagram of a hardware and production environment system 900 for determining a level of popularity of submission content, prior to publicizing the submission content with a question and answer customer support system, to improve user satisfaction with content of the question and answer customer support system, according to one embodiment.

As seen in FIG. 9, in one embodiment, a provider computing system 903 is provided in provider computing environment 901 and includes software system 905. In various embodiments, software system 905 is any software system discussed herein, known at the time of filing, and/or as developed after the time of filing.

As also seen in FIG. 9, user computing system 923 is provided in user computing environment 921. In one embodiment, a user of software system 905 accesses provider computing system 903 and software system 905 via communications channel 971.

In one embodiment, the users of software system 905 are also provided a question and answer customer support system 935 shown as implemented in question and answer customer support system computing system 933 in question and answer customer support system computing environment 931.

In one embodiment, through question and answer customer support system 935, users can submit submission content 726 via communications channel 973. The submission content 726 represents a product related question, a subject matter (e.g., tax law) question, or some combination of a product related and a subject matter question, according to one embodiment. In one embodiment, the submission content 726 is entered by the users and represents questions to potentially be provided to one or more support personnel associated with question and answer customer support system 935. In one embodiment, submission content 726 is submitted by the users so that the questions represented by submission content 726 can potentially be answered by at least one of the one or more support personnel.

In one embodiment, when submission content 726 is being entered by a user, and/or is otherwise received by question and answer customer support system 935, the submission content 726 is parsed and analyzed by a question format analysis module 941 before publicizing the submission content 726 for review by any of the one or more support personnel. In one embodiment, the submission content 726 is received by the question and answer customer support system 935 and is analyzed by the analytics model 706, with content attributes 712 to determine a likely level of popularity of the submission content 726. In one embodiment, the question and answer customer support system 935 alters or suggests alterations to the submission content 726 to improve the potential popularity of high-quality questions and content and to decrease the potential popularity of low-quality questions and content.

The question and answer customer support system 935 includes a user interface 947 that enables users to search the question and answer database 945 and that enables customer support personnel to populate the question and answer database 945 with answers in response to the submission content 726, according to one embodiment.

In one embodiment, queries of asking users are treated different based on the classification or relationship of the users with the question and answer customer support system 935. Example classifications or relationships include authenticated users who are registered with and logged into the question and answer customer support system 935, non-authenticated users who interact directly with the question and answer customer support system 935, and search engine users who are directed to, for example, the landing web page of the question and answer customer support system 935. In one embodiment, the question and answer customer support system 935 uses the analytics model 706 to predict the popularity of queries coming from all asking users. In another embodiment, the question and answer customer support system 935 employs two or more different analytics models to predict the popularity of submission content, based on the classification or relationship of the user with the question and answer customer support system 935.

The question and answer customer support system 935 can be configured to train the analytics model 706 using the data analysis module 704, as described above in the process 700 and illustrated in FIG. 7. For example, the data analysis module 704 analyzes the historical customer support content

708 using one or more algorithms such as logistic regression to determine relationships between the popularity of posts and the attributes of the submission content 726. Based on the training of the analytics model 706, the question and answer customer support system 935 can determine the likely level or class of popularity of the submission content 726, according to one embodiment. The question and answer customer support system 935 is communicatively coupled to the provider computing system 903 through a communications channel 977 to enable the question and answer customer support system 935 to obtain user information and/or user profiles from the software system 905 for use in the training or application of the analytics model 706, according to one embodiment.

In accordance with one embodiment, a computer implemented method determines a level of popularity of submission content, prior to publicizing the submission content with a question and answer customer support system, to improve user satisfaction with content of the question and answer customer support system. The method includes receiving, with a computing system, submission content from a user, with a question and answer customer support system, according to one embodiment. The method includes identifying a plurality of attributes of the submission content, according to one embodiment. The method includes applying at least some of the attributes of the submission content to an analytics model to generate a score from the analytics model that is indicative of a likely level of popularity of the submission content, according to one embodiment. Prior to publicizing the submission content with the question and answer customer support system, the method includes providing suggestions to the user for altering attributes of the submission content, to affect the score that is indicative of the likely level of popularity of the submission content, according to one embodiment.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG. s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computer-implemented method for determining a level of popularity of submission content, prior to publicizing the submission content with a question and answer customer support system, to improve user satisfaction with content of the question and answer customer support system, the method comprising:
   receiving, with a computing system, submission content from a user, with a question and answer customer support system;
   identifying a plurality of attributes of the submission content;
   applying at least some of the attributes of the submission content to an analytics model to generate a score from the analytics model that is indicative of a likely level of popularity of the submission content, wherein the analytics decreases the score with increases in the character length of a question summary included within the submission content; and
   prior to publicizing the submission content with the question and answer customer support system, providing suggestions to the user for altering attributes of the submission content, to affect the score that is indicative of the likely level of popularity of the submission content.

2. The method of claim 1, wherein the submission content includes question details.

3. The method of claim 2, wherein attributes of the submission content are selected from a group of attributes consisting of:
   a character length of the question details; and
   a first token of the question summary.

4. The method of claim 3, wherein the analytics model increases the score with increases in the character length of question details.

5. The method of claim 3, wherein the analytics model adjusts the score at least partially based on the first token of the question summary.

6. The method of claim 2, wherein altering the submission content includes increasing or decreasing a character length of at least one of the question summary and the question details.

7. The method of claim 1, wherein providing suggestions to the user for altering the submission content includes providing popularity-lowering suggestions that are likely to decrease the score that is indicative of the likely level of popularity of the submission content, to reduce a likelihood of views of the submission content by users of the question and answer customer support system after the question and answer customer support system publicizes the submission content.

8. The method of claim 1, wherein providing suggestions to the user for altering the submission content includes providing popularity-raising suggestions that are likely to increase the score that is indicative of the likely level of popularity of the submission content, to increase a likelihood of views of the submission content by users of the question and answer customer support system after the question and answer customer support system publicizes the submission content.

9. The method of claim 1, wherein the score is a floating point number having a range that includes 0 and 1.

10. The method of claim 1, wherein the analytics model is one of a number of analytics models used by the question and answer customer support system for determining the score that is indicative of the likely level of popularity of the submission content.

11. The method of claim 1, wherein the analytics model generates the score using at least one of logistic regression, classification, multinomial logistic regression, and neural networks.

12. The method of claim 1, wherein the score represents a likelihood that the likely level of popularity exceeds a predetermined threshold.

13. The method of claim 12, wherein the predetermined threshold is top 10 percent of viewed content that is posted by the question and answer customer support system.

14. The method of claim 12, wherein the predetermined threshold is top 10 percent of voted-on content that is posted by the question and answer customer support system.

15. The method of claim 1, further comprising:
   comparing the score to one or more thresholds to assign the submission content to one or more classes of popularity of content that is posted by the question and answer customer support system.

16. The method of claim 1, further comprising:
   determining a likely level of quality of response to the submission content, at least partially based on at least some of the attributes of the submission content,
   wherein providing suggestions to the user for altering the submission content includes providing popularity-lowering suggestions that are likely to decrease the score that is indicative of the likely level of popularity of the submission content, if the likely level of quality of response to the submission content is below a first threshold, to reduce a likelihood of views of the submission content by users of the question and answer support system after the question and answer customer support system publicizes the submission content,
   wherein providing suggestions to the user for altering the submission content includes providing popularity-raising suggestions that are likely to increase the score that is indicative of the likely level of popularity of the submission content, if the likely level of quality of response to the submission content exceeds a second threshold, to increase the likelihood of views of the submission content by users of the question and answer customer support system after the question and answer customer support system publicizes the submission content.

17. The method of claim 16, wherein the likely level of quality of response is associated with a likelihood of receiving an up vote other than a down vote from users who read the response to the submission content.

18. The method of claim 1, further comprising:
determining a likely level of quality of response to the submission content, at least partially based on at least some of the attributes of the submission content; and
altering the submission content to selectively increase or decrease the score generated by the analytics model for the submission content, to selectively increase or decrease the likely level of popularity of the submission content, to improve a reputation of quality for content of the question and answer customer support system, and to improve conversion rates of potential customers to paying customers for a tax return preparation system associated with the question and answer customer support system.

19. The method of claim 18, wherein altering the submission content includes altering the submission content without notifying the user.

20. The method of claim 1, further comprising:
training the analytics model using one or more previous years content in the question and answer customer support system.

21. A system for determining a level of popularity of submission content, prior to publicizing the submission content with a question and answer customer support system, to improve user satisfaction with content of the question and answer customer support system, the system comprising:
at least one processor; and
at least one memory coupled to the at least one processor, the at least one memory having stored therein instructions which, when executed by any set of the one or more processors, perform a process for determining a level of popularity of submission content, the process including:
receiving, with a computing system, submission content from a user, with a question and answer customer support system;
identifying a plurality of attributes of the submission content;
applying at least some of the attributes of the submission content to an analytics model to generate a score from the analytics model that is indicative of a likely level of popularity of the submission content wherein the analytics model increases the score with increases in a character length of a question summary included within the submission content; and
prior to publicizing the submission content with the question and answer customer support system, providing suggestions to the user for altering attributes of the submission content, to affect the score that is indicative of the likely level of popularity of the submission content.

22. The system of claim 21, wherein the submission content includes question details.

23. The system of claim 22, wherein the plurality of attributes of the submission content are selected from a group of attributes consisting of:
a character length of the question details; and
a first token of the question summary.

24. The system of claim 23, wherein the analytics model increases the score with increases in the character length of question details.

25. The system of claim 23, wherein the analytics model adjusts the score at least partially based on the first token of the question summary.

26. The system of claim 22, wherein altering the submission content includes increasing or decreasing a character length of at least one of the question summary and the question details.

27. The system of claim 21, wherein providing suggestions to the user for altering the submission content includes providing popularity-lowering suggestions that are likely to decrease the score that is indicative of the likely level of popularity of the submission content, to reduce a likelihood of views of the submission content by users of the question and answer customer support system after the question and answer customer support system publicizes the submission content.

28. The system of claim 21, wherein providing suggestions to the user for altering the submission content includes providing popularity-raising suggestions that are likely to increase the score that is indicative of the likely level of popularity of the submission content, to increase a likelihood of views of the submission content by users of the question and answer customer support system after the question and answer customer support system publicizes the submission content.

29. The system of claim 21, wherein the score is a floating point number having a range that includes 0 and 1.

30. The system of claim 21, wherein the analytics model is one of a number of analytics models used by the question and answer customer support system for determining the score that is indicative of the likely level of popularity of the submission content.

31. The system of claim 21, wherein the analytics model generates the score using at least one of logistic regression, classification, multinomial logistic regression, and neural networks.

32. The system of claim 21, wherein the score represents a likelihood that the likely level of popularity exceeds a predetermined threshold.

33. The system of claim 32, wherein the predetermined threshold is top 10 percent of viewed content that is posted by the question and answer customer support system.

34. The system of claim 32, wherein the predetermined threshold is top 10 percent of voted-on content that is posted by the question and answer customer support system.

35. The system of claim 21, wherein the process further comprises:
comparing the score to one or more thresholds to assign the submission content to one or more classes of popularity of content that is posted by the question and answer customer support system.

36. The system of claim 21, wherein the process further comprises:
determining a likely level of quality of response to the submission content, at least partially based on at least some of the attributes of the submission content,
wherein providing suggestions to the user for altering the submission content includes providing popularity-lowering suggestions that are likely to decrease the score that is indicative of the likely level of popularity of the submission content, if the likely level of quality of response to the submission content is below a first threshold, to reduce a likelihood of views of the submission content by users of the question and answer support system after the question and answer customer support system publicizes the submission content,
wherein providing suggestions to the user for altering the submission content includes providing popularity-raising suggestions that are likely to increase the score that is indicative of the likely level of popularity of the submission content, if the likely level of quality of response to the submission content exceeds a second threshold, to increase the likelihood of views of the submission content by users of the question and answer customer support system after the question and answer customer support system publicizes the submission content.

37. The system of claim 36, wherein the likely level of quality of response is associated with a likelihood of receiving an up vote other than a down vote from users who read the response to the submission content.

38. The system of claim 21, wherein the process further comprises:
   determining a likely level of quality of response to the submission content, at least partially based on at least some of the attributes of the submission content; and
   altering the submission content to selectively increase or decrease the score generated by the analytics model for the submission content, to selectively increase or decrease the likely level of popularity of the submission content, to improve a reputation of quality for content of the question and answer customer support system, and to improve conversion rates of potential customers to paying customers for a tax return preparation system associated with the question and answer customer support system.

39. The system of claim 38, wherein altering the submission content includes altering the submission content without notifying the user.

40. The system of claim 21, wherein the process further comprises:
   training the analytics model using one or more previous years content in the question and answer customer support system.

* * * * *